(12) United States Patent
Maaref et al.

(10) Patent No.: US 12,719,613 B2
(45) Date of Patent: Aug. 25, 2026

(54) METHODS FOR MOBILITY IN AN INTEGRATED TERRESTRIAL AND NON-TERRESTRIAL RADIO ACCESS SYSTEM

(71) Applicant: HUAWEI TECHNOLOGIES CO., LTD., Shenzhen (CN)

(72) Inventors: Amine Maaref, Kanata (CA); Aman Jassal, Kanata (CA); Jianglei Ma, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 290 days.

(21) Appl. No.: 18/361,893

(22) Filed: Jul. 30, 2023

(65) Prior Publication Data

US 2023/0370205 A1 Nov. 16, 2023

Related U.S. Application Data

(63) Continuation of application No. PCT/CN2021/074942, filed on Feb. 2, 2021.

(51) Int. Cl.
*H04L 5/00* (2006.01)
*H04L 1/08* (2006.01)
(Continued)

(52) U.S. Cl.
CPC .............. *H04L 1/1812* (2013.01); *H04L 1/08* (2013.01); *H04W 72/232* (2023.01); *H04W 84/06* (2013.01)

(58) Field of Classification Search
None
See application file for complete search history.

(56) References Cited

U.S. PATENT DOCUMENTS 11,736,997 B2 * 8/2023 Yang .................... H04W 76/15 370/331
12,308,976 B2 * 5/2025 Kou ...................... H04L 1/1896
(Continued)

FOREIGN PATENT DOCUMENTS

CN 111566971 A 8/2020
CN 111919503 A 11/2020
(Continued)

OTHER PUBLICATIONS

Vankayala, Satya Kumar et al. "On the Improved Memory Utilization in HARQ Pooling". 2020 International Conference on Signal Processing and Communications (SPCOM), Bangalore, India, 2020. 5 pages.

*Primary Examiner* — Sithu Ko
(74) *Attorney, Agent, or Firm* — Slater Matsil, LLP

(57) ABSTRACT

Aspects of the present disclosure provide, in a system that uses multiple radio link types for different networks within the system, methods for selecting more than one radio link type for transmission and acknowledgement of a signal to overcome a problem of mismatch of RTT of signaling over the different radio link types. As a particular example, in an integrated system including both a terrestrial network (TN) portion and a non-terrestrial network (NTN) portion, after an original signal is transmitted over the NTN portion, acknowledgement of the original signal, and retransmissions as necessary, can be carried out over the NT portion.

20 Claims, 14 Drawing Sheets

(51) Int. Cl.

| | |
|---|---|
| ***H04L 1/1812*** | (2023.01) |
| ***H04W 72/232*** | (2023.01) |
| *H04W 84/06* | (2009.01) |

(56) References Cited

U.S. PATENT DOCUMENTS

2019/0215104 A1* 7/2019 Salem .................. H04L 1/1893
2020/0228194 A1* 7/2020 Hassan Hussein ... H04L 1/1822
2022/0030511 A1* 1/2022 Wang .................. H04L 65/1095
2023/0275708 A1* 8/2023 Salah .................... H04L 1/1887
370/328
2024/0056164 A1* 2/2024 Matsuda ............... H04L 1/1685
2024/0072944 A1* 2/2024 Baek ..................... H04L 1/1896

FOREIGN PATENT DOCUMENTS

EP 2227058 A2 9/2010
KR 20200110619 A 9/2020
WO 2019137356 A1 7/2019

* cited by examiner

```
1> LinkConfigurationSet
    2> LinkId
    2> BeamAngularInformation
        3> AzimuthAngle
        3> ZenithAngle
    2> LinkConfiguration
        3> ControlChannelConfiguration
        3> DataChannelConfiguration
        3> ChannelStateInformationConfiguration
        3> ComponentCarrierConfiguration
```

FIG. 9
HARQ ID 1
HARQ ID 2
HARQ ID 3
HARQ ID 4
HARQ ID 5
HARQ ID 6
HARQ ID 7
HARQ ID 8
HARQ ID 9
HARQ ID 10
HARQ ID 11
HARQ ID 12
HARQ ID 13
HARQ ID 14
HARQ ID 15
HARQ ID 16
HARQ ID 17
HARQ ID 18
HARQ ID 19
HARQ ID 20
HARQ ID 22
HARQ ID 22
HARQ ID 23
HARQ ID 24
HARQ ID 25
HARQ ID 26
HARQ ID 27
HARQ ID 28
TN Link 1
TN Link 2
NTN Link
910
920
PHY Layer
930

METHODS FOR MOBILITY IN AN INTEGRATED TERRESTRIAL AND NON-TERRESTRIAL RADIO ACCESS SYSTEM

CROSS-REFERENCE TO RELATED APPLICATIONS

This application is a continuation of International Application No. PCT/CN2021/074942, filed on Feb. 2, 2021, which is hereby incorporated by reference in its entirety.

TECHNICAL FIELD

The present disclosure relates generally to wireless communications, and in particular embodiments, methods for mobility in an integrated terrestrial and non-terrestrial radio access system.

BACKGROUND

In some wireless communication systems, user equipments (UEs) wirelessly communicate with a base station (for example, NodeB, evolved NodeB or gNB) to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or device-to-device (D2D) communication.

Resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

Terrestrial network deployments have conventionally consisted of stationary base-stations. UEs are also conventionally considered to be ground based. In some implementations, when a UE connects to the terrestrial network, the UE transmits positioning reference signals to the network that allow the network to determine the position of the UE. Depending on factors such as the time of the day and the location of buildings in proximity to the UE, demand for bandwidth can vary at different locations in the network and at different times of the day. In order to meet such on-demand bandwidth constraints, network nodes such as drones, satellites and high-altitude platform stations can be used to allow user experience to remain at expected levels.

A non-terrestrial network (NTN) refers to a network, or a segment of a network, that uses an airborne or spaceborne vehicle for transmission. Spaceborne vehicles may include satellites such as Low Earth Orbiting (LEO) satellites, Medium Earth Orbiting (MEO) satellites, Geostationary Earth Orbiting (GEO) satellites and Highly Elliptical Orbiting (HEO) satellites. Airborne vehicles may include High Altitude Platforms (HAPs) encompassing Unmanned Aircraft Systems (UAS) such as Lighter-than-Air UAS (LTA) and Heavier-than-Air UAS (HTA). UAS operate in altitudes typically between 8 and 50 km and in some implementations may be quasi-stationary.

A terrestrial network (TN) includes conventional cellular networks such as $3^{rd}$ Generation (3G), Long Term Evolution (LTE), and New Radio (NR). Airborne transmit receive points (TRPs) can be deployed on-board drone-type vehicles and generally have an upper altitude range of approximately up to a few 100 m. Airborne TRPs can be considered part of the TN or the NTN depending on whether the airborne TRPs connect directly to the TN or through the NTN using wireless backhaul.

Integrated TN and NTN can extend coverage of terrestrial cellular networks and may enhance service quality. The TN provides primary service for the network. Satellites provide global seamless coverage. Airborne TRPs provide an on-demand based regional service boost. Joint operation of the TN and the NTN in an integrated radio access system comprising both TN and NTN components may enable a three dimensional (3D) wireless communication system.

Future networks, for example 6th Generation (6G) networks, are expected to support multi-connectivity for UEs across terrestrial base stations (T-BS) and non-terrestrial base stations (NT-BS). The T-BS and NT-BS can operate in multiple radio links. For example, a UE transmits or receives data over multiple radio links simultaneously, or in sequence. A radio link may refer to a combination of spatial (e.g. spatial filter, transmit beam, receive beam or beam index) and/or frequency resources (e.g. bandwidth part or component carrier).

UE connectivity across multiple links of different link types (e.g. TN links and NTN links) can result in a mismatch of roundtrip time (RTT) for a hybrid automatic repeat request (HARQ) process occurring over TN links as compared to NTN links. The RTT may also be referred to as over-the-air propagation delay. Such a mismatch is at least in part due to the large distance that a signal has to travel over the NTN links as compared to the TN links. The mismatch can cause difficulties with various aspects of signaling between nodes in the integrated system, an example of which may be hybrid automatic repeat request (HARQ) feedback and retransmissions. Mechanisms that may be able to address this mismatch may be able to provide a more robust and stable network and satisfactory user experience.

SUMMARY

Aspects of the present disclosure provide, in a system that uses multiple radio type links for different networks within the system, methods for selecting more than one radio type link for transmission and acknowledgement of a signal to overcome a problem of mismatch of RTT of signaling over the different radio type links. As a particular example, in an integrated system including both a TN portion and a NTN portion, after an original signal is transmitted over the NTN portion, acknowledgement of the original signal, and retransmissions as necessary, can be carried out over the NT portion.

The use of multiple link hybrid automatic repeat request (HARQ) feedback and retransmissions may provide lower latency for these types of HARQ signaling. The use of multiple link HARQ feedback and retransmissions via an integrated NT and NTN system node that is ground based allow signaling through a more reliable and stable radio link.

Some embodiments of the present disclosure provide a system that includes multiple link types using a single air interface in which quality of service (QoS) provisioning of resources over the multiple link types enable efficient resource utilization by matching traffic type with appropriate physical resources.

According to an aspect of the present disclosure, there are provided a method involving: a user equipment (UE) receiving configuration information to allow hybrid automatic repeat request (HARQ) process sharing across multiple radio link types; the UE receiving a first downlink control information (DCI) for scheduling a first transmission of a transport block (TB) in a first physical resource associated with a first radio link type, the first DCI comprising a first HARQ process ID; the UE receiving a second DCI for scheduling a retransmission of at least a portion of the TB in a second physical resource associated with a second radio link type, the second DCI comprising a second HARQ process ID; communicating, by the UE, with a first access node, in the first physical resource associated with the first radio link type, the first transmission with the first HARQ process ID and, communicating, by the UE, with a second access node in the second physical resource associated with the second radio link type, the second transmission with the second HARQ process ID; wherein the first HARQ process ID and the second HARQ process ID map to a shared HARQ process.

In some embodiments, the first radio link is a non-terrestrial network (NTN) radio link and the first access node is a NTN access node or an integrated access backhaul (IAB) NTN node.

In some embodiments, the second radio link is a terrestrial network (TN) radio link and the second access node is a TN access node or an IAB TN node.

In some embodiments, the first radio type link has a first propagation delay and the second radio link has a second propagation delay.

In some embodiments, the first propagation delay is longer than the second propagation delay.

In some embodiments, communicating the first and second transmissions comprises transmitting, by the UE, the first transmission to the first access node and transmitting the second transmission to the second access node.

In some embodiments, communicating the first and second transmissions comprises receiving, by the UE, the first transmission from the first access node and receiving the second transmission from the second access node.

In some embodiments, the method further includes the UE transmitting on a third physical resource of the second radio link type, an acknowledgement, based on the configuration information, indicating whether the TB was successfully received.

In some embodiments, the first physical resource and the second physical resource comprise at least one of a frequency resource, a time-frequency resource, a code resource, a spatial beam direction resource, a bandwidth part (BWP), a carrier, a component carrier, or a cell.

In some embodiments, configuration using the configuration information is performed in a semi-static manner.

In some embodiments, configuration using the configuration information is performed in a combination of a semi-static manner and dynamic manner.

In some embodiments, the configuration information includes: an indication indicating that a pool of HARQ process IDs are common across at least the first and second physical resources, wherein the first HARQ process ID and the second HARQ process ID are the same to indicate that the first and second HARQ process IDs map to the shared HARQ process.

In some embodiments, the second DCI comprises a field indicating that the second DCI is in respect of a retransmission of the TB.

In some embodiments, receiving the configuration information involves: receiving the configuration information in a semi-static manner that associates the second HARQ process ID with the first HARQ process ID, such that the first DCI including the first HARQ process ID, the second DCI including the second HARQ process ID, and the field in the second DCI together indicate that the first and second HARQ process IDs map to the shared HARQ process.

In some embodiments, when the first DCI and the second DCI are in respect of the same TB, the first DCI and the second DCI are received within a specified time window of one another.

In some embodiments, receiving the first DCI and the second DCI comprises receiving a single PDCCH.

In some embodiments, the first DCI comprises a first field indicating that there is a DCI in respect of the TB on a different physical resource; and the second DCI comprises a second field indicating that the second DCI is in respect to the TB transported on the different physical resource.

In some embodiments, the configuration information further comprises at least one semi-statically configured mapping rule that associates the first HARQ process ID on the first physical resource with the second HARQ process ID on the second physical resource, and wherein the first DCI including the first field and the second DCI including the second field together indicate that the first and second DCIs are in respect to the TB only when the first HARQ process ID is associated with the second HARQ process ID through the at least one mapping rule.

The method of any one of claims 1 to 18, further comprising receiving a HARQ codebook configuration indicating acknowledgement/negative acknowledgment (ACK/NACK) resources used for transmitting an ACK/NACK in respect of the TB or versions of the TB received over multiple physical resources.

In some embodiments, the HARQ codebook configuration indicates an ACK/NACK resource for transmitting an ACK/NACK in respect of the TB or versions of the TB received over multiple physical resources.

In some embodiments, the method further includes transmitting, by the UE, ACK/NACK feedback on the first physical resource and/or the second physical resource.

In some embodiments, the first or second physical resource is an unlicensed physical resource.

In some embodiments, the third physical resource is an unlicensed physical resource.

In some embodiments, the first DCI comprises a first TB size indicator indicating a size of a first TB and a first new data indicator (NDI); and wherein the second DCI comprises a second indicator DCI indicate the same TB size, and wherein the first NDI and the second NDI are the same.

In some embodiments, the first DCI comprises an indicator indicating at least one of: an identifier of the second physical resource; or the second HARQ process ID; or the second DCI comprises an indicator indicating at least one of: an identifier of the first physical resource; or the first HARQ process ID.

In some embodiments, the configuration information further comprises at least one mapping, rule, or parameter in respect of a rule that associates the second HARQ process ID with the first HARQ process ID.

In some embodiments, receiving the configuration information comprises receiving an association between the first HARQ process ID and the second HARQ process ID in a semi-static manner.

In some embodiments, the configuration information comprises an index offset indicating a index offset between the first and second HARQ process IDs.

In some embodiments, the configuration information comprises a number of shifts between the first and second HARQ process IDs.

In some embodiments, the configuration information comprises an index indicating an offset and a number of shifts that together with a semi-statically configured rule or formula associate the second HARQ process ID with the first HARQ process ID.

In some embodiments, the configuration information comprises at least one of: a new data indicator (NDI); a HARQ process identifier (ID) associated with the HARQ process; a redundancy version (RV) value; a number of blind repetitions; a time window for receiving the retransmission, a beam direction indication for transmitting the feedback information; and a beam direction indication for receiving the retransmission.

According to an aspect of the present disclosure, there are provided an apparatus including a processor and a computer-readable medium having stored thereon computer-executable instructions. The computer-executable instructions, when executed, cause the apparatus to: receive configuration information to allow hybrid automatic repeat request (HARQ) process sharing across multiple radio link types; receive a first downlink control information (DCI) for scheduling a first transmission of a transport block (TB) in a first physical resource associated with a first radio link type, the first DCI comprising a first HARQ process ID; receive a second DCI for scheduling a retransmission of at least a portion of the TB in a second physical resource associated with a second radio link type, the second DCI comprising a second HARQ process ID; communicate with a first access node, in the first physical resource associated with the first radio link type, the first transmission with the first HARQ process ID and, communicate with a second access node in the second physical resource associated with the second radio link type, the second transmission with the second HARQ process ID; wherein the first HARQ process ID and the second HARQ process ID map to a shared HARQ process.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1A:
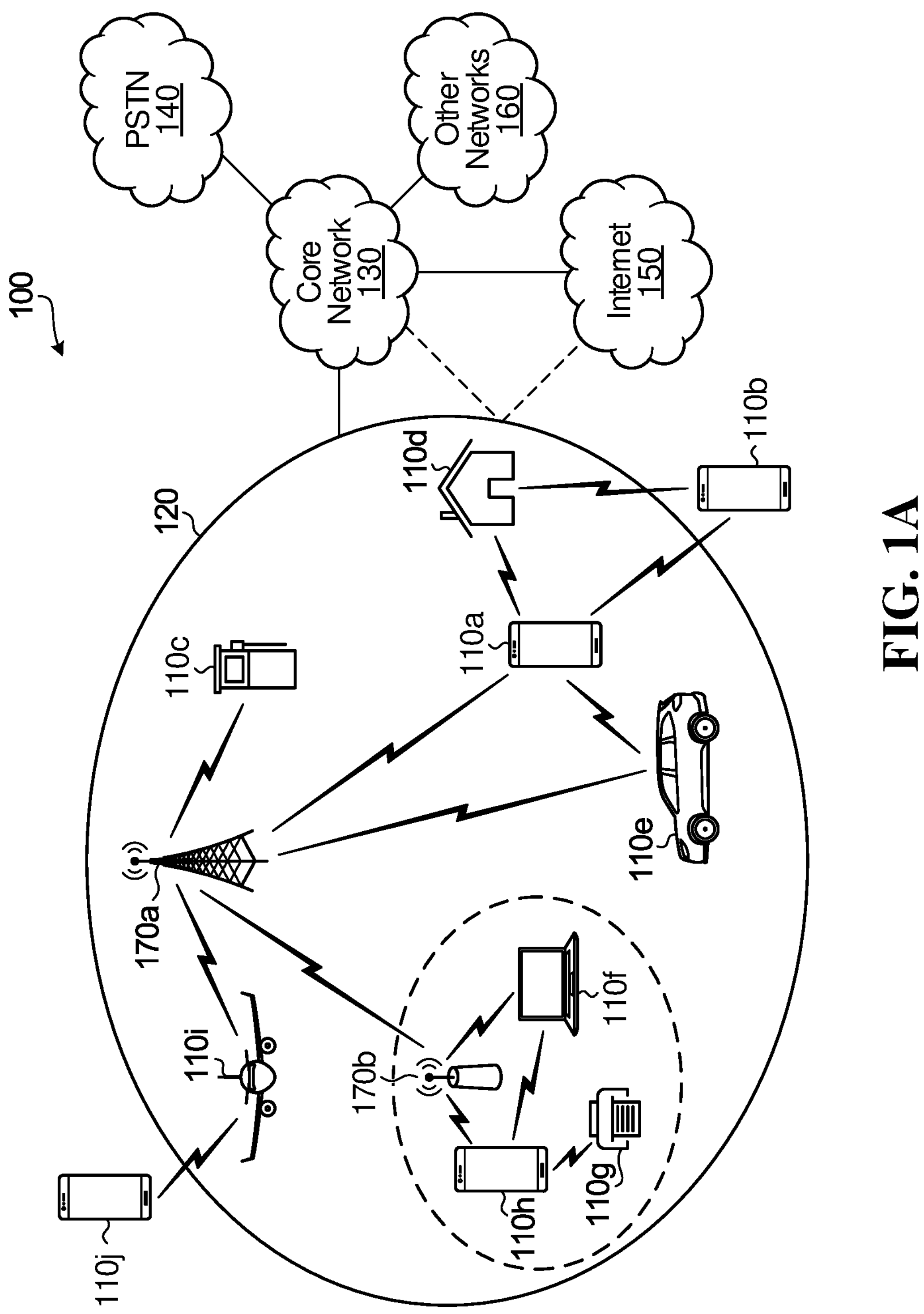
FIG. 1A is a schematic diagram of a communication system in which embodiments of the disclosure may occur.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

In a system that includes both terrestrial network (TN) nodes and non-terrestrial network (NTN) node, a UE may be connected to both a NTN node (e.g. LEO, VLEO satellite, HAPS) and a TN node (e.g. macro cell or small cell TRP). Connection to the NTN node may provide a seamless global coverage and mobility robustness and connection to the TN node may provide large data throughput.

UE connectivity across multiple links of different link types (e.g. TN links and NTN links) can result in a mismatch of roundtrip time (RTT) for a hybrid automatic repeat request (HARQ) process occurring over TN links as compared to NTN links. The RTT may also be referred to as a propagation delay. Such a mismatch is at least in part due to the large distance that a signal has to travel over the NTN links as compared to the TN links.

Aspects of the present disclosure provide, in a system that uses multiple radio type links for different networks within the system, methods for selecting more than one radio type link for transmission and acknowledgement of a signal to overcome a problem of mismatch of RTT of signaling over the different radio type links. As a particular example, in an integrated system including both a TN portion and a NTN portion, after an original signal is transmitted over the NTN portion, acknowledgement of the original signal, and retransmissions as necessary, can be carried out over the NT portion.

FIGS. 1A, 1B, 2A, and 2B following below provide context for the network and device that may be in the network and that may implement aspects of the present disclosure.

Referring to FIG. 1A, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110*a*-120*j* (generically referred to as 110) may be interconnected to one another, and may also or instead be connected to one or more network nodes (170*a*, 170*b*, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

Figure 1B:
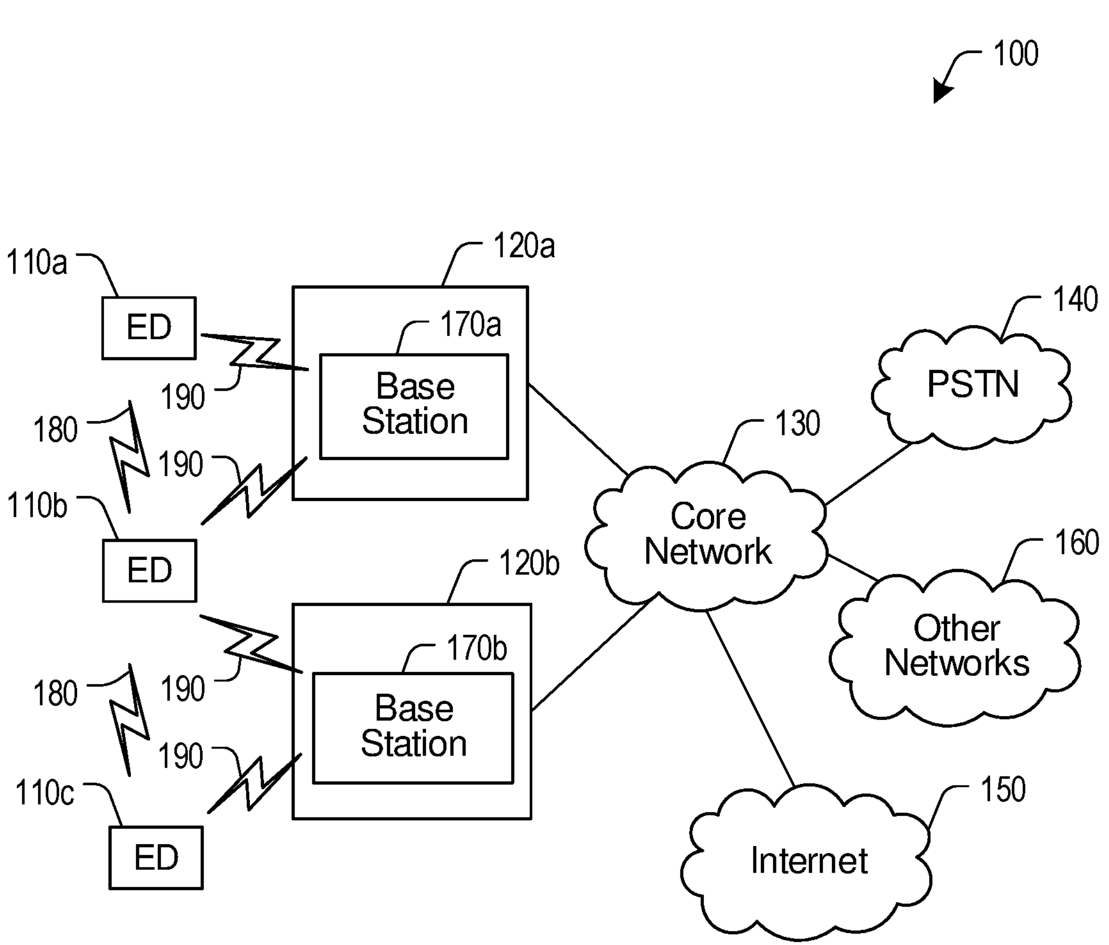
FIG. 1B is another schematic diagram of a communication system in which embodiments of the disclosure may occur.

FIG. 1B illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110*a*-110*c*, radio access networks (RANs) 120*a*-120*b*, a core network 130, a public switched telephone network (PSTN) 140, the Internet 150, and other networks 160. Although certain numbers of these components or elements are shown in FIG. 1B, any reasonable number of these components or elements may be included in the system 100.

The EDs 110*a*-110*c* are configured to operate, communicate, or both, in the system 100. For example, the EDs 110*a*-110*c* are configured to transmit, receive, or both via wireless communication channels. Each ED 110*a*-110*c* represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

FIG. 1B illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110*a*-110*c*, radio access networks (RANs) 120*a*-120*b*, a core network 130, a public switched telephone network (PSTN) 140, the internet 150, and other networks 160. Although certain numbers of these components or elements are shown in FIG. 1B, any reasonable number of these components or elements may be included in the communication system 100.

The EDs 110*a*-110*c* are configured to operate, communicate, or both, in the communication system 100. For example, the EDs 110*a*-110*c* are configured to transmit, receive, or both, via wireless or wired communication channels. Each ED 110*a*-110*c* represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1B, the RANs 120*a*-120*b* include base stations 170*a*-170*b*, respectively. Each base station 170*a*-170*b* is configured to wirelessly interface with one or more of the EDs 110*a*-110*c* to enable access to any other base station 170*a*-170*b*, the core network 130, the PSTN 140, the internet 150, and/or the other networks 160. For example, the base stations 170*a*-170*b* may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router.

In some examples, one or more of the base stations 170*a*-170*b* may be a terrestrial base station that is attached to the ground. For example, a terrestrial base station could be mounted on a building or tower. Alternatively, one or more of the base stations 170*a*-170*b* may be a non-terrestrial base station that is not attached to the ground. A flying base station is an example of the non-terrestrial base station. A flying base station may be implemented using communication equipment supported or carried by a flying device. Non-limiting examples of flying devices include airborne platforms, such as a blimp or an airship, balloons, and other aerial vehicles. In some implementations, a flying base station may be supported or carried by an unmanned aerial system (UAS) or an unmanned aerial vehicle (UAV), such as a drone or a quadcopter. A flying base station may be a moveable or mobile base station that can be flexibly deployed in different locations to meet network demand. A satellite base station is another example of a non-terrestrial base station. A satellite base station may be implemented using communication equipment supported or carried by a satellite. A satellite base station may also be referred to as an orbiting base station.

Any ED 110*a*-110*c* may be alternatively or additionally configured to interface, access, or communicate with any other base station 170*a*-170*b*, the internet 150, the core network 130, the PSTN 140, the other networks 160, or any combination of the preceding.

The EDs 110*a*-110*c* and base stations 170*a*-170*b* are examples of communication equipment that can be configured to implement some or all of the operation and/or embodiments described herein. In the embodiment shown in FIG. 1B, the base station 170*a* forms part of the RAN 120*a*, which may include other base stations, base station controller(s) (BSC), radio network controller(s) (RNC), relay nodes, elements, and/or devices. Any base station 170*a*, 170*b* may be a single element, as shown, or multiple elements, distributed in the corresponding RAN, or otherwise. Also, the base station 170*b* forms part of the RAN 120*b*, which may include other base stations, elements, and/or devices. Each base station 170*a*-170*b* transmits and/or receives wireless signals within a particular geographic region or area, sometimes referred to as a "cell" or "coverage area". A cell may be further divided into cell sectors, and a base station 170*a*-170*b* may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120*a*-120*b* shown is exemplary only. Any number of RAN may be contemplated when devising the communication system 100.

The base stations 170*a*-170*b* communicate with one or more of the EDs 110*a*-110*c* over one or more air interfaces 190 using wireless communication links e g radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal 1-DMA (OFDMA), or single-carrier FDMA (SC-FDMA) in the air interfaces 190.

A base station 170*a*-170*b* may implement Universal Mobile Telecommunication System (UMTS) Terrestrial Radio Access (UTRA) to establish an air interface 190 using wideband CDMA (WCDMA). In doing so, the base station 170*a*-170*b* may implement protocols such as High Speed Packet Access (HSPA), Evolved HPSA (HSPA+) optionally including High Speed Downlink Packet Access (HSDPA), High Speed Packet Uplink Access (HSPUA) or both. Alternatively, a base station 170*a*-170*b* may establish an air interface 190 with Evolved UTMS Terrestrial Radio Access (E-UTRA) using LTE, LTE-A, and/or LTE-B. It is contemplated that the communication system 100 may use multiple channel access operation, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120*a*-120*b* are in communication with the core network 130 to provide the EDs 110*a*-110*c* with various services such as voice, data, and other services. The RANs 120*a*-120*b* and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120*a*-120*b* or EDs 110*a*-110*c* or both, and (ii) other networks (such as the PSTN 140, the internet 150, and the other networks 160).

The EDs 110*a*-110*c* communicate with one another over one or more sidelink (SL) air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110*a*-110*c* communication with one or more of the base stations 170*a*-170*c*, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

In addition, some or all of the EDs 110*a*-110*c* may include operation for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110*a*-110*c* may be multimode devices capable of operation according to multiple radio access technologies, and incorporate multiple transceivers necessary to support multiple radio access technologies.

Figure 2A:
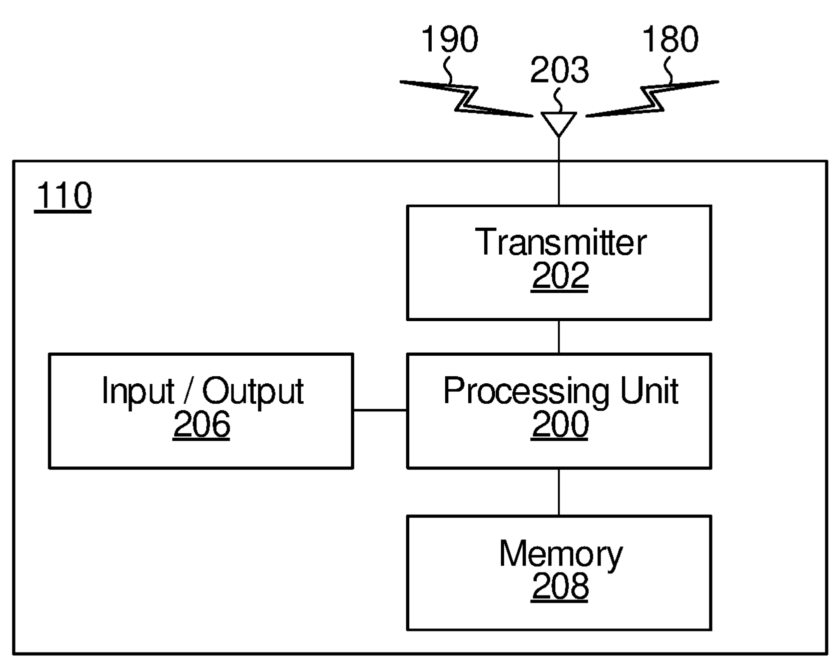
FIGS. 2A and 2B are block diagrams of an example user equipment and base station.
Figure 2B:
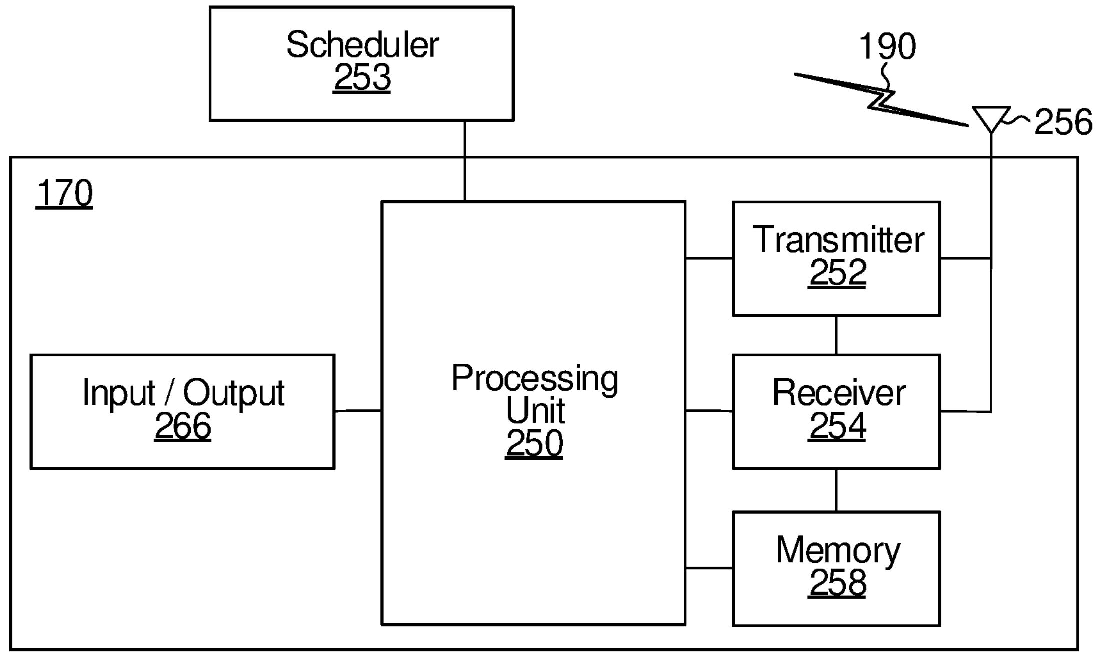

FIGS. 2A and 2B illustrate example devices that may implement the methods and teachings according to this disclosure. In particular, FIG. 2A illustrates an example ED 110, and FIG. 2B illustrates an example base station 170. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna 204 or Network Interface Controller (NIC). The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the operations and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the operations and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the operations and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

When a UE performs initial access (IA) to a network, the UE receives an initial configuration from the network regarding radio link configuration corresponding to a given TN node or a given NTN node. The initial configuration can be provided to the UE using a higher-layer signaling in the form of one or more radio link configurations including one or more of mobility resources, control resources, data resources, carrier resources, component carrier resources, cell resources, bandwidth part (BWP) resources, physical channel and reference signal resources etc.

Figures 3, 4:
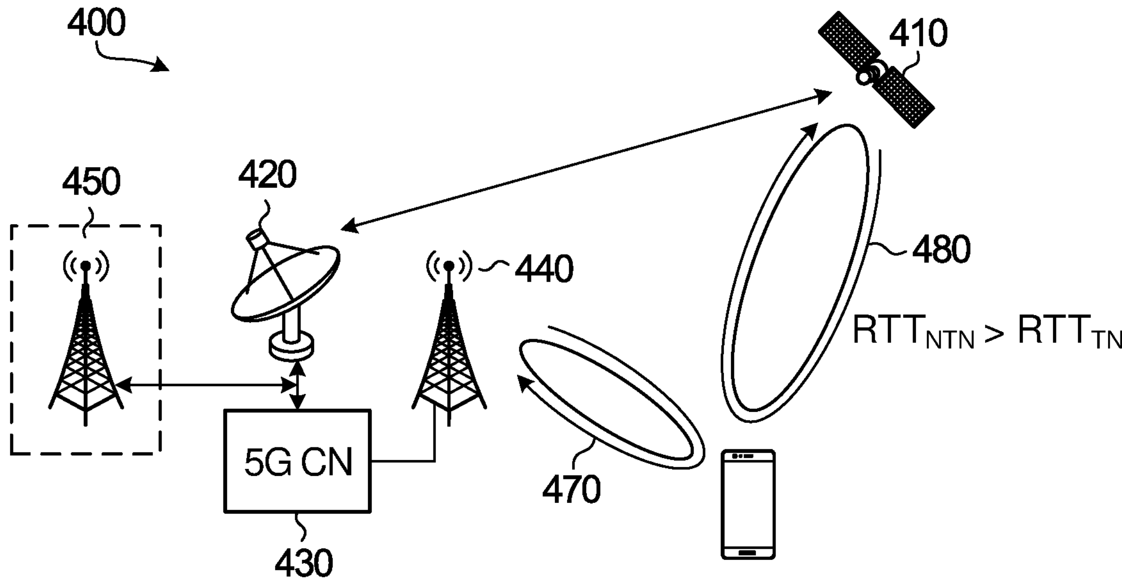
FIG. 3 is a representation of configuration information for use in configuring a multiple parameters of a radio link.
FIG. 4 is a schematic diagram of an integrated NT and NTN system that shows that NTN HARQ round trip time (RTT) is typically larger than TN HARQ RTT.

FIG. 3 is an example of a representation of configuration information that may be provided in higher layer configuration to identify a group of a physical resource (e.g. mobility resource, control resource, data resource, carrier resource, component carrier resource, bandwidth part (BWP) resource, physical channel resource and/or reference signal resource) and an associated receive or transmit beam assumption to enable the UE to transmit and or receive physical control and data channels and signals on a certain radio link. The hierarchy shown in FIG. 3, and the subsequent figures with similar labelling, of Levels 1, 2 and 3, is merely to facilitate an understanding of information included in the configuration message and it is to be understood that there might not be explicit level labelling included with this parameter information.

For each link configuration set, a link identifier (ID), beam information and link configuration are provided. The beam information is expressed using parameters that indicate the region of space where the UE is configured to steer the UE transmit or receive beam.

In FIG. 3, Level 1 is a naming convention for the link configuration information (for example "LinkConfigurationSet"). Level 2 includes naming conventions for a link identifier (ID) ("LinkID"), beam information ("BeamAngularInformation") and link configuration ("LinkConfiguration"). The LinkID may refer to configuration information pertaining to a bandwidth part (BWP), a carrier, a component carrier or a physical layer cell. Level 3 includes a naming convention for beam angular information that includes configuration information to beam direction information. Beam direction information includes configuration information to define a beam direction azimuth angle ("azimuthAngle"), a beam direction azimuth angle range ("azimuthAngleRange"), a beam direction zenith angle ("zenithAngle"), and a beam direction zenith angle range ("zenithAngleRange"). Beam direction angle ranges are used by the network to indicate to the UE beam width that is covered for a beam direction angle, along with its granularity in degrees. This allows the network to perform further fine-tuning of the beam direction indication at the UE side, based for example, UE movement, network node movement or changing radio conditions. These beam direction angles indicate to the UE where to steer the UE receive beam in order to detect, demodulate and decode the physical layer channel that is part of a grouping of a physical layer channel and an associated receive beam assumption or transmit beam in order to transmit physical signals and channels. These beam direction angles are also used by the UE to steer the UE receive beam in order to detect and measure the reference signal that is part of a grouping of a physical layer channel and an associated receive beam. Level 3 also includes a naming convention for the link configuration including control channel information ("ControlChannelConfiguration"), data channel information ("DataChannelConfiguration"), channel state information (CSI) configuration information ("ChannelStateInformationConfiguration") and component carrier configuration ("ComponentCarrierConfiguration"). These three types of configuration information may include information defining the data and control channels and information defining an appropriate CSI measurement and reporting scheme. Not all of these separate link configurations ("ControlChannelConfiguration", "DataChannelConfiguration", "ChannelStateInformationConfiguration" and "ComponentCarrierConfiguration") are necessarily configured in a given implementation. In some embodiments, some, but not all of the configuration information is provided to the UE. In some embodiments, all of the configuration information is provided to the UE.

In some embodiments, a link may be configured using configuration information pertaining to the physical resource and the spatial beam related information, i.e. "BeamAngularInformation", can be provided separately and independently to the UE irrespective of the physical resource configuration. In such cases, the radio link configuration is substantially just the physical resource configuration e.g. "ComponentCarrierConfiguration".

In some embodiments, the radio link configuration may be limited to a carrier, component carrier, bandwidth part (BWP) configuration, or serving cell configuration. A BWP configuration in New Radio (NR) includes a numerology (subcarrier spacing and cyclic prefix (CP)) and a set of consecutive physical resource blocks (RBs) in the numerology of the BWP within the uplink (UL) or downlink (DL) carrier bandwidth of a given cell, as well as a starting common RB index. An RB is a set of consecutive subcarriers in the frequency domain, for example in NR the RB is a set of 12 consecutive subcarriers in the frequency domain A resource element consisting of one subcarrier during one OFDM symbol is a smallest physical resource in NR. Therefore, an RB in a given numerology has the same frequency span as 12 consecutive resource elements of the same numerology. Upon detecting a synchronization signal block (SSB), the UE is configured with a reference point A in a transmission resource which coincides with subcarrier 0 of common resource block 0 for all subcarrier spacings. Reference point A serves as the reference point with respect to a carrier and the BWPs within that carrier. Common RBs serve to define the location in the frequency domain of the BWPs and physical RBs are used to describe the actual transmissions within the BWP. For example, uplink physical channels (e.g. PUSCH) are scheduled within uplink BWPs. Physical downlink channels are scheduled within downlink BWPs of a given carrier of a given serving cell or a component carrier of a given serving cell in the case of carrier aggregation using physical RBs. The location of uplink and downlink physical channels in the frequency domain is determined in units of common RBs separation from the reference point A. In a connected state, the UE can be configured with multiple DL BWPs (e.g. 4 in NR) and multiple UL BWPs (e.g. 4 in NR in addition to 4 supplementary BWPs in the case of supplementary UL carrier) for each serving cell. In each serving cell, one or more of the configured UL BWPs are referred to as active UL BWPs for the serving cell and one or more of the configured DL BWPs are referred to as active DL BWPs for the serving cell. On a given carrier, the UE can receive downlink data transmissions (e.g. PDCCH and PDSCH) within an active DL BWP or transmit data transmissions (e.g. PUCCH and PUSCH) within an active UL BWP. In a carrier aggregation or multi-connectivity framework, a UE is able to transmit or receive simultaneously on multiple component carriers or cells. In a carrier aggregation framework, a UE is able to transmit and or receive data from multiple cells simultaneously. In NR, each cell comprises a HARQ entity which is associated with one or multiple HARQ processes. In NR, HARQ retransmissions of a given cell cannot move between cells/component carriers but can move between different BWPs of a given cell. Embodiments of the present disclosure provide solutions that allow HARQ retransmissions to move between cells and components carriers associated with different radio link types.

The configuration information shown in FIG. 3 may be used for any number of links that need to be configured. The link configuration can be used for different link types, such as TN links or NTN links. In order to provide a suitable user experience under a multi-link connectivity framework, the network and the UE may follow a synchronized timeline in order to ensure that both network nodes and the UE follow mutually approved operating rules. By way of a non-limiting example, TN and NTN links may be synchronized i.e. a downlink time is aligned within a certain time duration, such as a cyclic prefix (CP) duration or a fixed time duration. An example of a fixed time duration may include boundaries of a respective frame, subframe, slot, or symbol positions of TN and NTN links that are within a fixed time duration of each other. Such synchronization requirements may be used for time divisional duplex (TDD) operation in unpaired spectrum bands to ensure DL timing alignment across different cells.

The parameter names used in the configuration information of FIG. 3 are not intended as names that would need to be used for specific implementations. They are being used as examples of a naming convention for particular functionality that is described.

The terms link and radio link (RL) are used synonymously throughout this document to describe the link between two network nodes.

In a multiple link connectivity system that includes an integrated TN and NTN, a UE may be connected simultaneously to both a NTN node (e.g. LEO, VLEO satellite, HAPS) and a TN node (e.g. macro cell or small cell TRP). Connection to the NTN node may provide a wide-area coverage and mobility robustness and connection to the TN node may provide large data throughput.

UE multi-link connectivity across multiple links of different link types (e.g. TN links and NTN links) may result in a mismatch of roundtrip time (RTT) for a hybrid automatic repeat request (HARQ) process occurring over TN links as compared to NTN links. This mismatch is due in part to the large distance that a signal has to travel over the NTN links as compared to the TN links. The HARQ RTT for a NTN link can range from several milliseconds to hundreds of milliseconds depending on the satellite orbit, whereas the HARQ RTT for a TN link may be several milliseconds.

Furthermore, in the NTN, propagation delay that occurs between a gateway and a satellite may further increase the HARQ RTT.

FIG. 4 illustrates an example system 400 that includes a TN and an NTN. The NTN includes a satellite 410 and a NTN gateway node 420 for connecting the satellite 410 to a 5G core network 430. The TN includes two base stations (BSS) 440 and 450. A UE 460 is shown to be communicating with BS 440 and satellite 410. As the TN cells are generally small in physical size (hundreds of meters to tens of kilometers) as compared to NTN (tens of kilometers to hundreds of kilometers), the TN RTT 470 is less than the NTN RTT 480. Although the core network 420 in the example system 400 of FIG. 4 is identified as a 5G core network, it should be understood that the core network could be of any type.

There are many use scenarios that can utilize integrated connectivity with both a TN and a NTN. Some examples include on-demand big-event ad hoc facilities in areas where the existing service is inadequate for the big-event, urban and sub-urban environments where TN and NTN coverage may overlap, and public transport vehicles such as regular and high-speed trains, buses, river boats.

Release (Rel) 16 and Rel 17 of the NR standard have proposed to investigate some aspects, and have specified solutions for other aspects, of supporting non-terrestrial networks because TN and NTNs are currently considered separately from one another. Therefore, TN and NTN systems are deployed independently and a UE is connected to either TN or NTN, but not both. Aspects of the present disclosure provide an integrated TN and NTN system where TN and NTN are subsystems of a wireless network system and the UE registered to the wireless network system can establish a connection to either one or both of the subsystems. Such connections allow the UE to communicate with a TN node or a NTN node through RLs that can be configured by either the TN node or the NTN node.

LTE and NR handle HARQ process operations in a similar way in which a limited set number of HARQ processes are restricted to a single component carrier (CC) or cell. LTE and NR also use a fixed number or HARQ processes per CC across all CCs. For example, the number of HARQ processes is 8 in LTE and 16 in NR. This is because substantially equal RTT is assumed between the UE and different terrestrial nodes, such as terrestrial network base stations (TN-BSS) that the UE is communicating with. The number of HARQ processes per CC or cell may be matched to the HARQ RTT in order to prevent a stall in communications when the maximum number of available HARQ processes is smaller than the HARQ RTT due to the stop-and-wait HARQ protocol.

Figure 5:
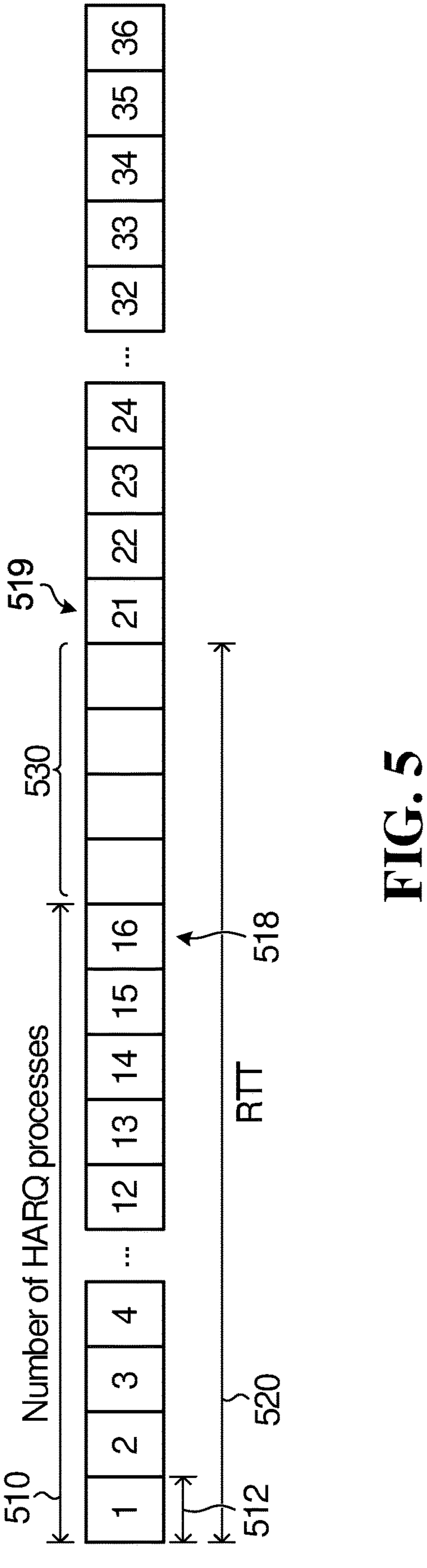
FIG. 5 is a schematic diagram illustrating how a stall of HARQ signaling may occur when a maximum number of available HARQ processes is smaller than HARQ RTT.

FIG. 5 illustrates an example of a number of HARQ processes used in a case of a transmitter scheduling data transmissions to a receiver when the number of HARQ processes supported by a MAC HARQ entity using the stop-and-wait HARQ protocol is less than the HARQ RTT. In FIG. 5, the number of HARQ processes 510 is shown to be 16. Each HARQ process is allocated a transmission time 512 for a transmission opportunity. FIG. 5 shows a series of consecutive time periods, the first 16 of which are numbered. These 16 time periods correspond to time periods that can be used for the 16 HARQ processes. The RTT 520 between the transmitter and receiver is shown to take 20 time intervals. Therefore, between the first occurrence of the 16th HARQ processes 518 and a second occurrence of the first HARQ process 519 occurring at the 20th time period, there are four time intervals 530 that cannot be used for transmitting data to the UE. This is an example of the stop-and-wait protocol where the second occurrence of HARQ process 1 has to wait from time interval 17 to time interval 21. This is what is called HARQ stall, where the scheduler is unable to schedule new data transmissions to a UE due to the absence of an available HARQ process.

In order for multi-link connectivity to be supported for both TN nodes and NTN nodes, the present disclosure proposes that the long HARQ RTT delays experienced over NTN links can be reduced by retransmissions, when necessary, being performed over a TN link when a prior transmission of a HARQ version of the TB was sent over a NTN link or vice versa. In another scenario, if an initial transmission of a TB was made by in the TN and the TN node transmitting the initial transmission is not capable of transmitting retransmission, or the TN node cannot transmit the retransmission to the UE due to temporary outage or poor coverage, then a HARQ retransmission can be retransmitted over the NTN. This is not currently an option in existing NR systems, because HARQ retransmissions are restricted to the same CC in which the original transport block (TB) occurred. HARQ retransmissions are restricted to the same CC on which the original TB occurred because separate HARQ processes and separate HARQ entities are used for each CC in LTE/NR carrier aggregation (CA) or dual-connectivity (DC) framework. Significant delays and data throughput reduction are caused by this restriction.

Figure 6:
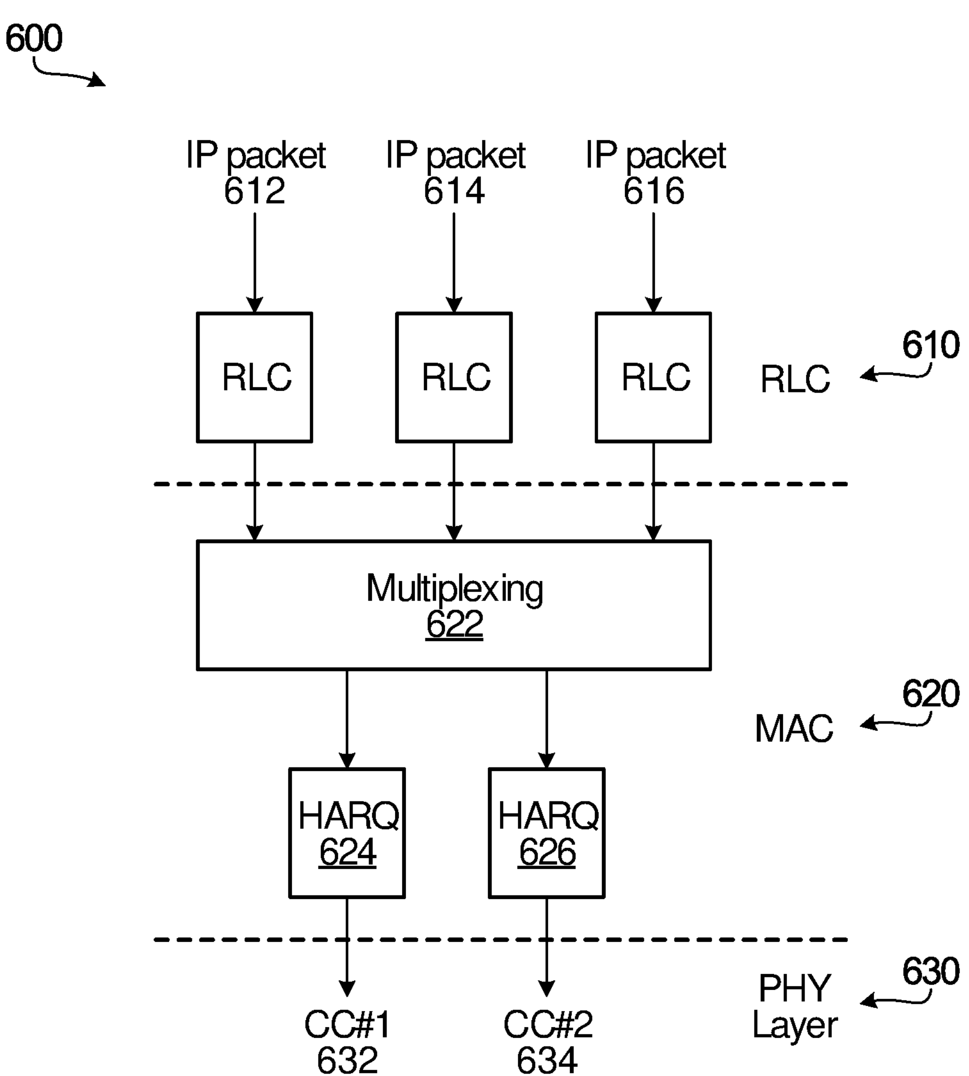
FIG. 6 is a schematic diagram showing separate HARQ entities in a media access control (MAC) layer per component carrier (CC) in LTE and NR.

FIG. 6 is a representative illustration 600 of how HARQ is handled over the radio link control (RLC) layer 610, the media access control (MAC) layer 620 and the physical (PHY) layer 630 when each CC has a corresponding HARQ entity and an associated set of HARQ processes, each HARQ process having a respective HARQ process ID. IP packets 612, 614. 616 coming from the packet data convergence protocol (PDCP) layer are processed at the RLC layer 610 and are passed to the MAC layer 620. The packets are multiplexed 622 at the MAC layer 620 and two streams are output, one stream to each of two HARQ entities 624 and 626. HARQ entity 624 is used for HARQ feedback and retransmissions on carrier CC #1 632 in the PHY layer 630 and HARQ entity 626 is used for HARQ feedback and retransmissions on carrier CC #2 634.

Because of the long HARQ RTT in NTN, UL HARQ feedback for DL transmissions is configured so that the UL HARQ feedback can be disabled over NTN links, if desired. This can be configurable on a per UE basis or a per HARQ process basis, or both. In addition, HARQ uplink retransmissions can be configured to be disabled, also on a per UE basis, a per HARQ process basis, a per logical channel (LCH) basis, or some combination thereof. However, disabling HARQ over the NTN link and having to rely on Radio Link Control automatic request (RLC ARQ) for achieving reliability targets can lead to problems. For example, higher layer signaling might not be received by the UE, and if DL data TBs are not correctly received by the UE, it may be a long time before the TBs not being received is realized by the BS. Examples of higher layer signaling can include media access control-control element (MAC-CE) messages or radio resource control (RRC) signaling.

Embodiments of the present disclosure reduce the negative impact of latency and throughput of variable RTT for a multi-link connected UE that is receiving data on the downlink and/or transmitting data on the uplink across multiple links (e.g. to both a TN node and a NTN node simultaneously).

Figure 7A:
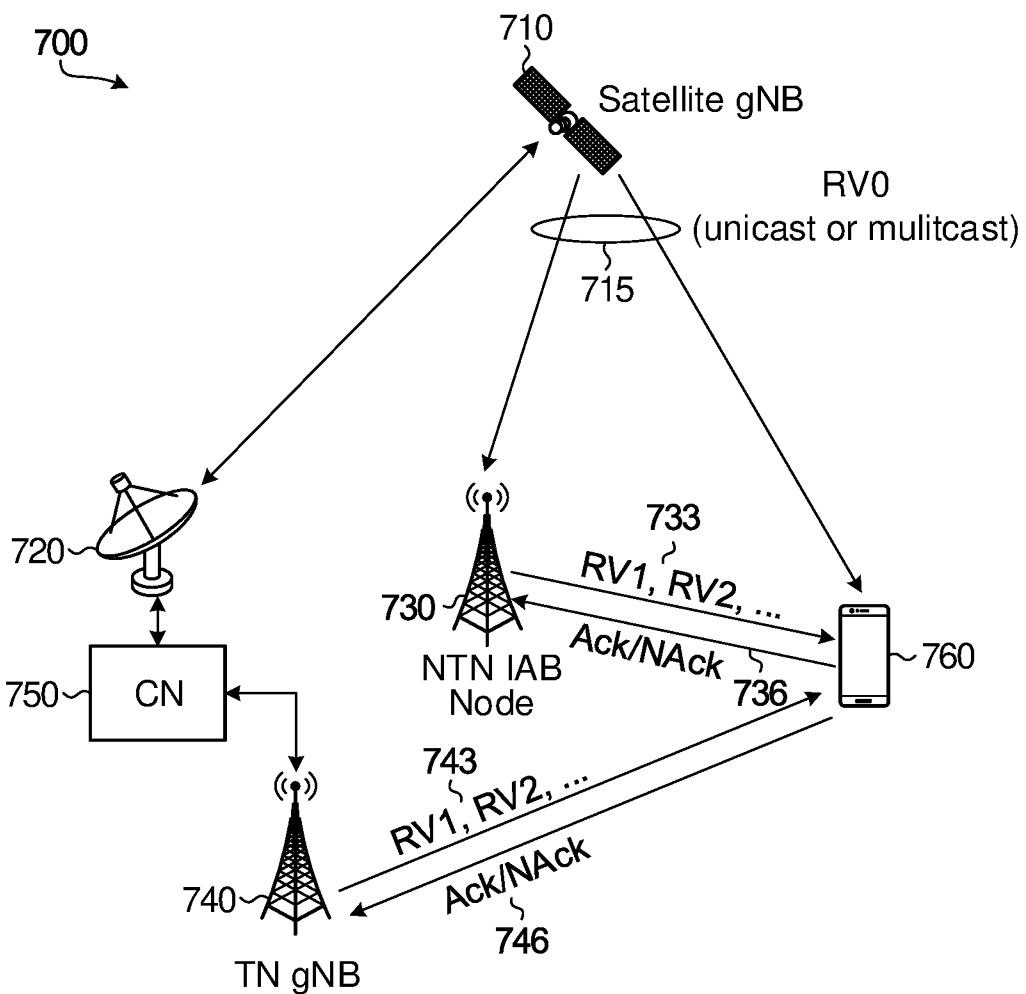
FIGS. 7A and 7B are schematic diagrams of an integrated NT and NTN system according to embodiments of the present disclosure.

FIG. 7A illustrates an integrated TN/NTN system 700 in which embodiments of the application may be implemented. The NTN includes a satellite 710, an NTN gateway station 720 for communicating wirelessly with the satellite 710 and an integrated access and backhaul (IAB) base station (BS) or other type of node 730 for communicating wirelessly with the satellite 710. An example of another type of NTN node may be a relay node such as a relay, a UE relay, a UE-to-Network relay, IAB node relay. The NT BS or node 730 can be ground based or an aerial based node, such as a drone, blimp, or quadcopter. An NTN IAB BS or node 730 relies on IAB for backhaul and comprises a distributed unit (DU) functionality for serving UEs or other potential child IAB nodes in case of multi-hop IAB and a mobile terminal (MT) functionality which connects to the DU of the parent node or donor node. In this embodiment, the satellite 710 would play the role of the IAB donor node or parent node. The NTN gateway station 720 is a ground station for connecting the satellite to the core network. The link between NTN gateway station 720 and satellite is referred to as a feeder link and the link between the satellite and devices that the satellite serves (e.g. NTN IAB node 730 or UE 760) is called a service link. The TN includes a BSS 740 connected via a wired (e.g. fiber) connection to the core network 750. A target UE 760 is shown to be communicating with TN BS 740, NTN BS 730 and satellite 710. Although an IAB node is particularly referred to in the present description and provide some description of IAB functionalities, it should be understood that embodiments described herein can apply to all types of NTN nodes that may be included in the NTN.

In embodiments of the present disclosure, in an integrated TN/NTN network, and more generally in a multi-link connectivity environment with links of different link types, HARQ feedback and retransmissions may be transmitted with lower latency and improved reliability, by one or more of the UE's connections to nodes closer to ground. Examples of UE connections to nodes closer to ground may include the connection between the target UE 760 and the NTN IAB BS 730, the connection between the target UE 760 and TN BS 740, and a connection between the target UE 760 and a TN UE or a NTN UE, neither of which are shown in FIG. 7A.

FIG. 7A illustrates an initial transmission 715 of a transport block (TB) i.e. indicated as redundancy version 0, (RV0), being transmitted from the satellite 710 to the UE 760 and the NTN IAB BS 730. HARQ retransmissions 733, 743 including other redundancy versions (RV1 and RV2) are transmitted from a connection node, and thus flow through more stable and reliable radio links. The connection node here may be the NTN IAB BS 730 or the TN BS 740. HARQ acknowledgement/negative acknowledgement (ACK/NACK) feedback 736, 746 from the target UE 760 can be directed towards the connection node, either the NTN IAB BS 730 or the TN BS 740.

In some embodiments, there may be a different type of radio link, which may also be referred to as an air interface, between the UE and the connection node (for example NTN IAB BS 730 or the TN BS 740) than the radio type link between the connection node (or the UE) and the NTN node (satellite 710). For example, if the connection node is a NTN IAB BS (for example 730), the air interface between the UE and the NTN BS consists of a UL/DL access link air interface and the air interface between the NTN BS and the NTN node (satellite) is a wireless backhaul air interface, which may be totally or partially different than the access link air interface. If the connection node is a second UE (not shown in FIG. 7A), the air interface between the UE and the second UE is a sidelink air interface and the air interface between the second UE and the NTN node is a UL/DL air interface.

Figure 7B:
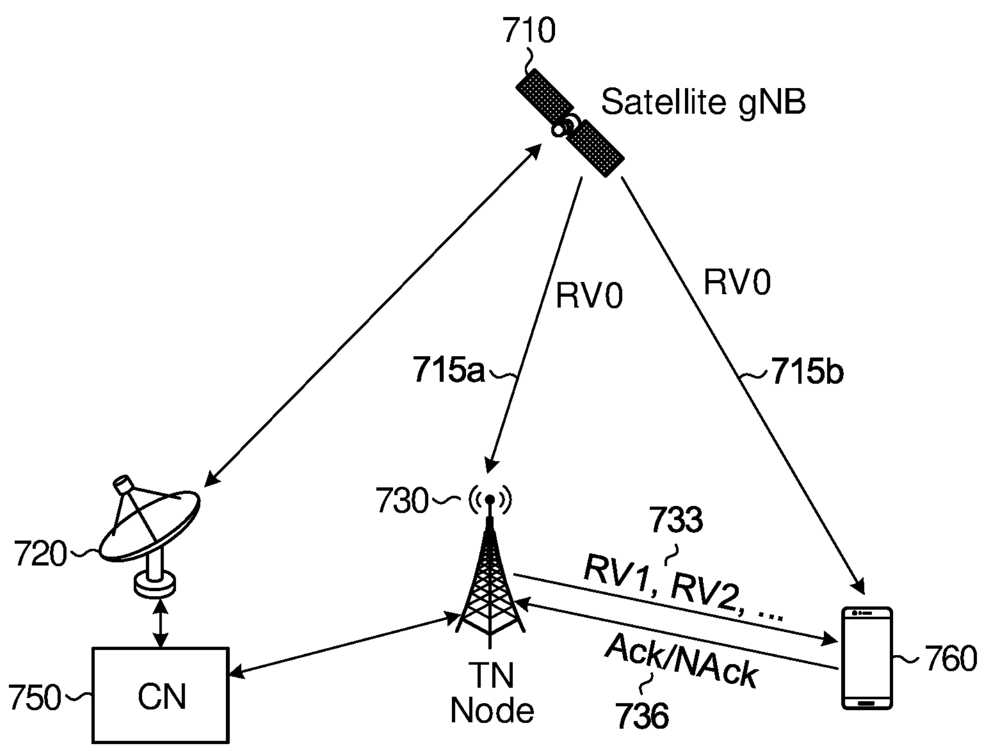

FIG. 7B is a variation of FIG. 7A in which the connection node is shown to be the TN BS 740 that is connected through a wireless backhaul link to the satellite 710. FIG. 7B shows an initial transmission 715*a* and 715*b* is shown to be sent over a NTN radio link using either a unicast transmission or a multicast transmission. When sent as a multicast transmission, the initial transmission, both 715*a* received by the TN BS 740 and 715*b* received by the UE 760, includes a TB addressed to the UE 760 using a physical downlink control channel (PDCCH) with a cyclic redundancy check (CRC) scrambled with a UE identifier. The UE identifier is known by both the connection node and the target UE. The UE identifier may be a cell RNTI (C-RNTI) of the target UE or a common ID known or configured to both the connection node and the target UE. Therefore, the UE 760 and the TN BS 740 can decode the TB and the TN BS 740 can be used to send retransmissions (RV1, RV2) 733 to the UE 760 instead of the satellite 710 having to send retransmissions to the UE. In addition, the UE 760 can send ACK/NACK feedback 736 to the TN BS 740 instead of to the satellite 710. In this example, the TN BS 740 behaves as an IAB node with a wireless backhaul link to the satellite 710 and a wireless access link to the UE 760.

When sent as a unicast transmission, the initial transmission is unicast 715*b* to the UE over DL and also unicast 715*a* to the NTN IAB node 730 over the wireless backhaul link. The NTN IAB node 730 receives the initial transmission 715*a* from the satellite over the wireless backhaul link using a PDCCH with CRC scrambled with an identifier, such as a C-RNTI, of the NTN IAB node 730. The UE 760 decodes the TB addressed to the UE, that is scrambled with the UE 760 identifier. The NTN IAB node 730 decodes the TB addressed to the UE, but scrambled with the NTN IAB node 740 identifier. Identity of the target UE, e.g. target UE C-RNTI, may be signaled to the NTN IAB node explicitly e.g. via MAC CE command conveyed over a physical downlink shared channel (PDSCH) or implicitly scrambled with the target UE identifier, such as the C-RNTI, of the target UE or a common ID known or configured to both the NTN IAB node 730 and the UE 760. The NTN IAB node 730 can be used to send retransmissions (RV1, RV2) 733 to the UE 760 instead of the satellite 710 having to send retransmissions to the UE. In addition, the UE 760 can send ACK/NACK feedback 736 to the NTN IAB node 730 instead of to the satellite 710. In this example, the NTN IAB node 730 effectively behaves as an IAB node with a wireless backhaul connection to the satellite In some embodiments, the initial transmission may include an indication of a number of blind retransmissions that may be attempted. In some embodiments, the original transmission may include slot aggregation with an aggregation factor larger than 1, in which case the TB is repeated in each slot of the slot aggregated transmission.

Downlink control information (DCI) may be used for scheduling the initial transmission from the satellite 710. The DCI is received by the UE 760 and the TN BS 740 over PDCCH or signaled using a MAC-CE command over PDSCH. The DCI may further include one or more of 1) a new data indicator (NDI), a HARQ process ID, a redundancy version (RV) and a number of blind repetitions, 2) an indication that the HARQ feedback for the initial transmission as well as DL HARQ retransmissions are to be carried out by the connection node based on a certain grouping of physical layer channel and an associated receive beam. In some embodiments, this can be a CC configured to be received by the UE with a certain receive beam, 3) time offset for sending ACK/NACK feedback and a time window for receiving DL retransmission over a link that can be represented by a grouping of a physical resource (e.g. component carrier of a serving cell) and an associated receive beam and 4) quantized beam indication for ACK/NACK feedback transmission by the UE to the connection node and HARQ retransmission reception over a link that can be represented by a grouping of a physical layer resource (e.g. component carrier of a serving cell) and an associated receive beam.

For slot based scheduling, the time offset for sending ACK/NACK feedback and the time window (W) for receiving DL retransmission is a timing between receiving DL data (e.g. a last repetition of PDSCH of the original transmission) in slot N in the first radio type link and sending the acknowledgment in slot N+K in the second radio link type. K can be a UE capability signaled by the UE to the network. For example, all UEs can support K>=1 and only some UEs can support K=0. The value of K should allow for enough processing time at the UE to decode PDSCH on the first radio link and prepare for transmitting the ACK/NACK feedback on the second radio link. For mini-slot based scheduling where transmission can span a few symbols (e.g. less than a slot duration), the timing can be expressed in terms of symbols rather than slots. The timing offset can also be expressed in terms of absolute time units e.g. 2 milliseconds. After the UE sends feedback, the UE can monitor for PDCCH of potential retransmission in the second radio link during the indicated time window W after sending the negative acknowledgment feedback NACK. The time window W can be indicated by another timing offset with respect to the timing of sending the ACK/NACK feedback.

In some embodiments, cross-link HARQ feedback and retransmission can be activated and deactivated dynamically through the DCI that schedules the initial transmission. The term “cross-link” here is used to indicated that the HARQ process occurs across multiple radio link types. In the example of FIG. 7B, the HARQ process occurs across both TN and NTN radio link types because the original transmission is sent on a NTN radio link between the satellite 710 and the UE 760 and the HARQ feedback and retransmissions can be sent on TN radio links between the TN BS 740 and the UE 760.

In some embodiments, the use of cross-link HARQ feedback and retransmissions according to embodiments described herein may provide lower latency for these types of HARQ signaling.

In some embodiments, the use of cross-link HARQ feedback and retransmissions via a connection node that is ground based allow signaling through a more reliable and stable radio links.

Cross-link HARQ feedback and retransmissions according to embodiments of the present disclosure may resolve issues related to disabling HARQ feedback and HARQ retransmissions over NTN links that are currently being used. As described above, such disabling can result in the NTN BS not knowing for a prolonged period of time if DL TBs have been correctly received by UE.

In some embodiments, the initial DL transmission sent to a target UE is sent over a first radio type link and HARQ retransmissions can be sent over a second radio type link. The first radio type link and the second radio type link are associated with a same HARQ entity.

Figure 8:
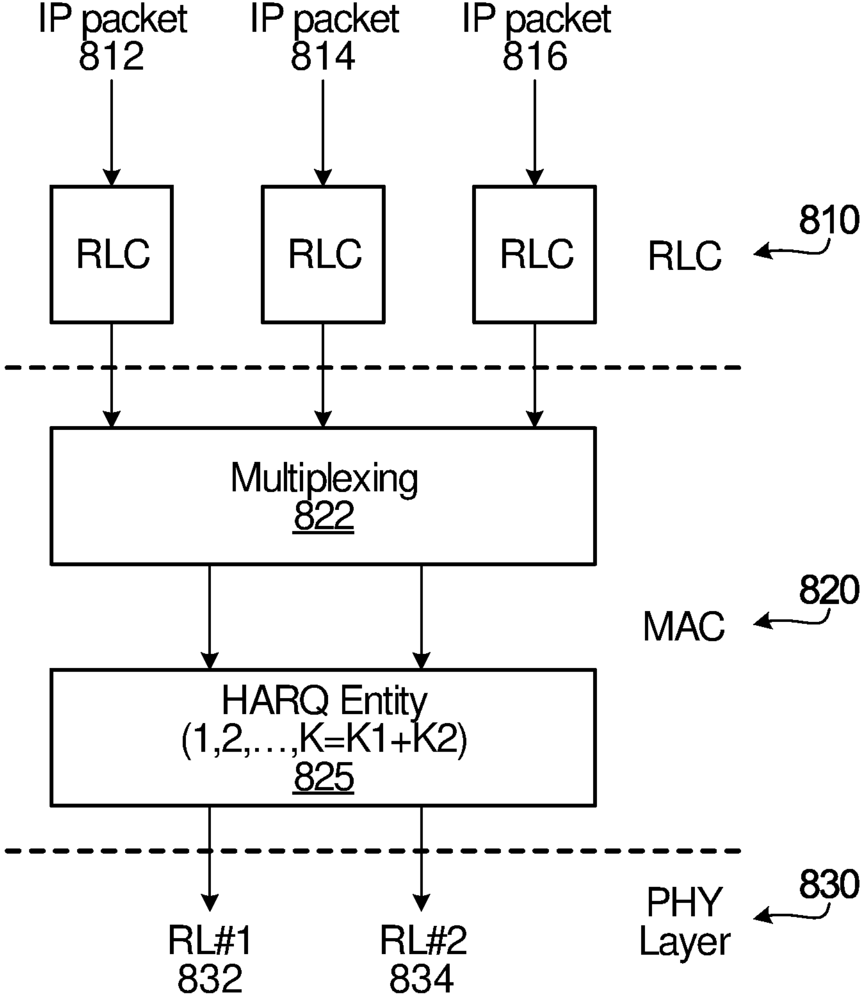
FIG. 8 is a schematic diagram showing a shared HARQ entity in a MAC layer for multi-link type connectivity according to embodiments of the present disclosure.

FIG. 8 is a representative illustration of how HARQ processes may be handled over the RLC layer 810, the MAC layer 820 and the PHY layer 830 according to aspects of the present application. IP packets (812, 814 and 816) coming from the PDCP layer are processed at the RLC layer 810 and passed to the MAC layer 822. The packets are multiplexed 822 at the MAC layer 820 which supports a single HARQ entity 825 comprising multiple HARQ processes, each having a respective HARQ ID. There are two streams after being multiplexed 822, each stream directed to a RL, even though the MAC layer 820 supports a single HARQ entity 825. All the HARQ processes can be used to transmit data using both RLs RL #1 832 and RL #2 834. The number of HARQ processes is equal to the number of HARQ processes for each of two RL RL #1 832 and RL #2 834. A RL may include a single component carrier (CC). In the case of FIG. 8, the total number of HARQ processes is shown to be the sum of K1 HARQ processes for RL #1 832 and K2 HARQ processes for RL #2 834. The shared HARQ processes in HARQ entity 825 are associated with only two radio links in FIG. 8. More generally, the HARQ entity is associated with an implementation specific number of radio links.

In some embodiments, a set of HARQ processes is shared by a single HARQ entity for multiple component carriers to enable HARQ retransmissions (repetition or duplication) across a group of PHY layer RLs that simultaneously serve a multiple link connected UE in a flexible manner. The PHY layer RLs may be BWPs, carriers, component carriers or cells in a CA context or a combination of these with a spatial transmit or receive beam direction.

Some embodiments of the present application allow HARQ retransmissions across multiple PHY RLs. A single HARQ entity (as shown in FIG. 8) handling a total of $K_i$ HARQ processes per RL, where i=1, . . . , N. The HARQ entity controls $K=\Sigma K_i$ HARQ processes across all RLs or group of RLs.

In some embodiments, the number of HARQ processes supported by a UE may be a UE capability that is signaled by the UE to the network. One manner in which UEs may be categorized is according to how many HARQ processes they can support. For example, the more HARQ processes the UE can support per HARQ entity or across all supported HARQ entities, the higher the UE capability. The UE may report the capability of the UE to the network prior to using embodiments that are described herein.

In some embodiments, a pool of K HARQ process IDs associated with K HARQ processes is shared across PHY layer radio links or a group of PHY radio links in a single common HARQ entity across multiple component carriers or radio links.

In some embodiments, the UE may be configured with the association of each HARQ process ID in the pool and a corresponding radio link. In some embodiments, the corresponding radio link may be indicated using a radio link index. In some embodiments, the configuration may be signaled to the UE via RRC signaling. The configuration may be updated via MAC-CE, DCI, or a combination thereof.

Figure 9:
FIG. 9 is a table that illustrates HARQ process IDs for corresponding HARQ processes shared across multiple radio links according to embodiments of the present disclosure.

FIG. 9 illustrates an example of a table in which all the HARQ process IDs of a common HARQ entity are each associated with particular radio links HARQ process IDs 1-4 are associated with terrestrial network (TN) radio link 1 910, HARQ process IDs 5-12 are associated with TN radio link 2 920, and HARQ process IDs 13-28 as associated with a non-terrestrial network (NTN) radio link 930.

In some embodiments, associations of HARQ process IDs and radio links can be explicitly provided to the UE. Using FIG. 9 as an example for explicitly providing the associations, the UE would receive signaling indicating that HARQ process IDs 1-4 are associated with TN RL 1 910, HARQ process IDs 5-12 are associated with TN RL2 920 and HARQ process IDs 13-28 are associated with NTN RL 3 930.

In some embodiments, HARQ process IDs and corresponding radio links can implicitly be provided to the UE in the form of a relative offset. Using FIG. 9 as an example for implicitly providing the associations, the UE would receive signaling indicating two relative offset values, 4 and 8, which indicate a first 4 HARQ process IDS are associated with a first radio link, and then sets of 8 HARQ process IDS are associated with subsequent allocated radio links Therefore, the UE could deduce that HARQ process IDs 1-4 are associated with TN RL 1 910, HARQ process IDs 5-12 are associated with TN RL 2 920 and HARQ process IDs 13-28 are associated with NTN RL 3 930. In addition, the UE may receive a mapping between HARQ process IDs of different CCs/RLs. For example, a one-to-one mapping between the first 4 HARQ process IDs of RL1, RL2 and RL3 would indicate to the UE that when receiving a PDCCH indicating HARQ process ID 13 on RL1, this could be a repetition of a prior transmission with HARQ process ID 1 over RL1, and so on, for HARQ ID 14 mapped to HARQ ID 2, HARQ ID 15 mapped to HARQ ID 3 and HARQ ID 16 mapped to HARQ ID 4.

Based on the associations of HARQ process IDs and radio links and the mapping rules between HARQ process IDs associated with different RLs, the UE knows how to combine HARQ (re)transmissions that have a same HARQ process ID when the retransmissions are received on the same radio link. The term (re)transmissions refers to both the initial transmission and subsequent retransmissions. When the UE is scheduled to receive a HARQ retransmission TB over an allocated radio link and is provided in DCI with a HARQ process ID that is not pre-associated with the allocated radio link, then the UE implicitly knows that the signal corresponds to a cross-link HARQ retransmission. The UE may then combine the TB with any previously stored versions of the TB associated in the allocated RL with the HARQ ID for which a one-to-one mapping has been configured to the UE. For example, when the UE receives a PDCCH indicating HARQ process ID 13 on RL1, and the new data indicator (NDI) field is not toggled indicating a retransmission of a previously transmitted TB, the UE can combine the new TB version with the previously stored version of the TB that was received with PDCCH indicating HARQ process ID 1 over RL1.

In some embodiments, a common HARQ entity may be used across CCs or links in a multi-connectivity system in order to enable the sharing of HARQ processes across the CCs or links in an integrated network comprising multiple link types, for example TN radio links and NTN radio links.

In some embodiments, using the common HARQ entity preserves a per CC or radio link scheduling approach, thereby avoiding a more complex centralized scheduling process across multiple different CCs or radio links.

In some embodiments, HARQ RTTs of different durations for different CCs, or radio links, can be matched in duration by configuring a different number of HARQ processes for the different CCs or radio links. This may avoid, or reduce the possibility of, HARQ stalling due to a stop-and-wait HARQ procedure. This duration matching may also avoid, or reduce the possibility of, overprovisioning of HARQ process IDs as compared to the case where the same number of HARQ processes are used across a group of different CCs or radio links. In some embodiments, this duration matching may also minimize HARQ buffer memory requirements at the UE. In some embodiments, this duration matching may also support a larger number of CCs for a given HARQ buffer memory size.

In some embodiments, using the common HARQ entity may allow performing HARQ retransmissions from any CC or radio link, independent of the CC or radio link from which the prior transmissions or retransmissions were performed. This may be beneficial in the context of integrated TN/NTN networks in 6G, because of the longer RTT and lower reliability typical of NTN links as compared to conventional TN links.

Figure 10:
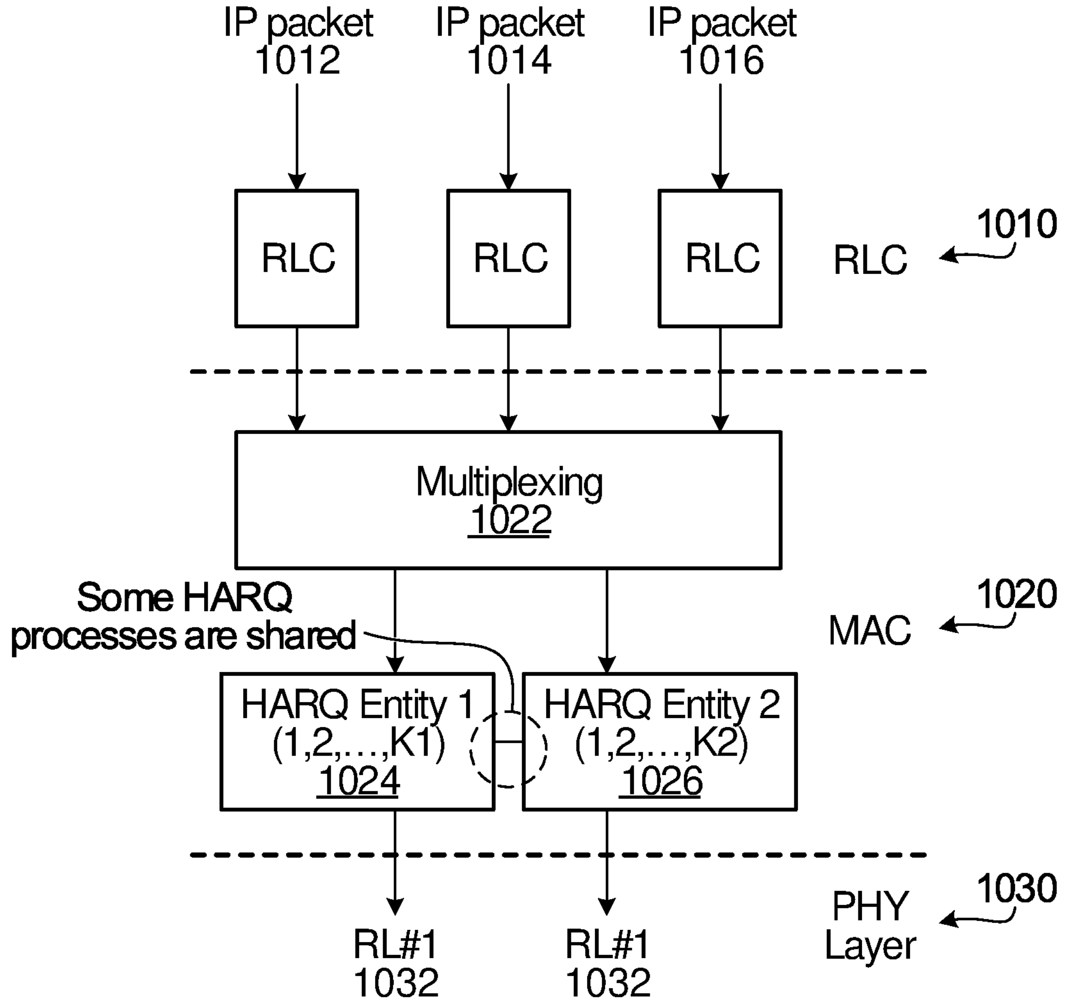
FIG. 10 is a schematic diagram showing a multiple HARQ entities in a MAC layer that have at least one shared HARQ process for multi-link type connectivity according to embodiments of the present disclosure.

FIG. 10 is a representative illustration of another embodiment of how HARQ may be handled over the RLC layer 1010, the MAC layer 1020 and the PHY layer 1030, in this case where one or more HARQ processes are shared over multiple HARQ entities 1024 and 1026. IP packets (1012, 1014, 1016) coming from the PDCP layer are processed at the RLC layer 1010 and passed to the MAC layer 1020. The packets are multiplexed 1022 at the MAC layer 1020 and two streams are provided to corresponding HARQ processes 1024 and 1026. Although this may appear similar to FIG. 6, the two HARQ entities in FIG. 10 share some HARQ processes. In FIG. 6, a single HARQ entity includes all HARQ processes, which implies that all HARQ processes are shared across the different RLs, even though some of them may be associated with different RLs.

In some embodiments, a pool of K HARQ process IDs associated with K HARQ processes is shared across PHY layer radio links or a group of PHY radio links by multiple HARQ entities, thereby sharing at least one of the same HARQ process IDs.

In some embodiments, if a number of HARQ processes per RL is equal to K, and K is greater than 1, then the number of HARQ processes shared across CCs of a given radio link, P, is less than K. In such a case, repetition, or duplication of HARQ process IDs across CCs draw from a pool of P HARQ processes.

In some embodiments, if a number of HARQ processes per CC is equal to K, and K is greater than or equal to 1, then the number of HARQ processes shared across a subset of RLs, M, where M is less than N RLs, where N is equal to a total number of RLs. In such a case, repetition or duplication across RLs draws from a pool of P HARQ processes for M RLs.

In a particular example, where P=3, K=8, M=2, N=4, this means that there are K=8 HARQ process, wherein there are M=2 shared HARQ process that are selected from a pool of P=3 HARQ processes and the M=2 shared HARQ process are shared over N=4 RLs.

Figure 11:
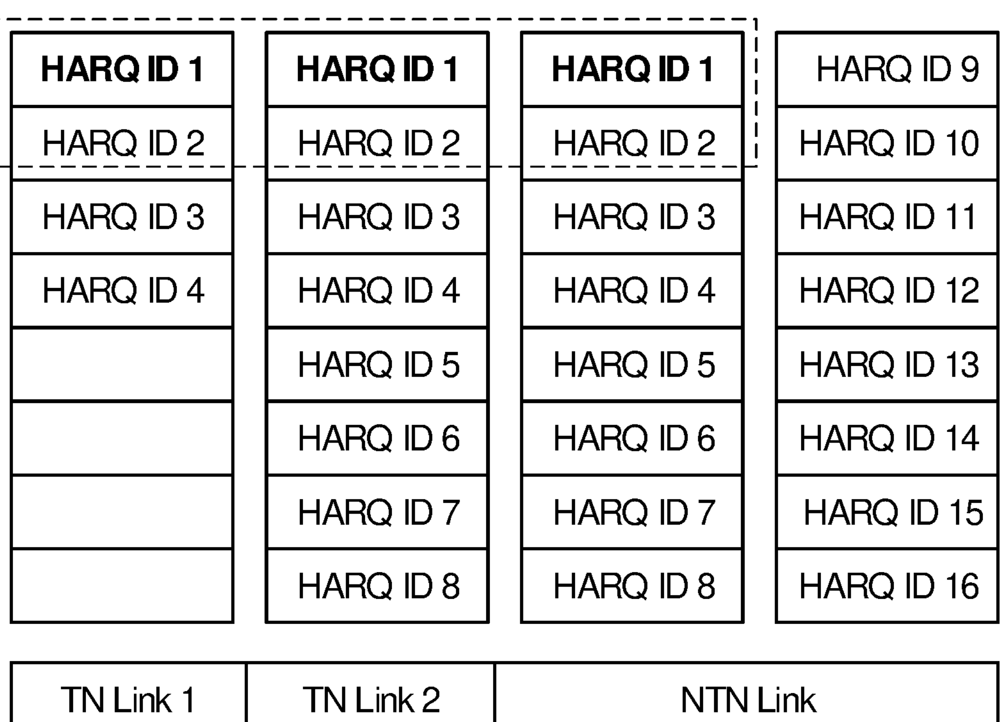
FIG. 11 is a table that illustrates HARQ process IDs for corresponding HARQ processes where several HARQ process are shared across multiple radio links according to embodiments of the present disclosure.

FIG. 11 illustrates an example of a table in which there are three separate HARQ entities, a first HARQ entity for TN link 1 1110, a second HARQ entity for TN link 2 1120 and a third HARQ entity for a NTN link 1130. HARQ process IDs 1 and 2 are shared amongst the first, second and third HARQ entities for each of TN link 1 1110, TN link 2 1120, and the NTN link 1130. The first HARQ entity also includes non-shared HARQ process IDs 3 and 4 associated with TN link 1 1110. The second HARQ entity also includes non-shared HARQ process IDs 3-8 associated with TN link 2 1120. The third HARQ entity also includes non-shared HARQ process IDs 3-16 associated with the NTN link 1130.

When the UE is scheduled to receive a TB over a radio link and a DCI indicates the scheduled signal has a HARQ process ID 1 or 2, then the UE implicitly knows the TB corresponds to a cross-link HARQ retransmission. The UE may then combine the TB with any previously stored version of the TB associated with the HARQ ID that corresponds to the radio link that the HARQ process ID was originally associated with. By way of example, the UE can combine a newly received TB with HARQ ID 1 on RL1 with any previously stored version of the TB received over RL2 with HARQ process ID 1. Basically, the UE just combines the TBs received with the same HARQ ID 1 with any previously stored version of the same TB received with HARQ ID 1 over any of the RLs.

In some embodiments, the separate HARQ entities might not share HARQ process IDs, but the UE may be configured with a mapping table that associates HARQ process IDs from different HARQ entities as potential HARQ process IDs that could be used for cross-link retransmission or duplication. By way of example, in the previously described embodiment, HARQ process ID 1 is the same across the three different links because HARQ process ID 1 is being shared. However, when configured with a mapping table, a mapping rule can be used that would associate HARQ ID 3 of RL 3 to HARQ ID 1 of RL 1. In such a case, the HARQ IDs are not shared, but the mapping rule would allow the UE to combine HARQ retransmissions on the HARQ process IDs for which the mapping is defined. In some embodiments, such configuration information may be signaled to the UE via UE-specific or UE dedicated RRC signaling and updated via MAC-CE, DCI, or a combination thereof.

In some embodiments, multiple HARQ entities that share HARQ process IDs may preserve a per CC or per radio link scheduling approach, thereby avoiding a more complex centralized scheduling across multiple different CCs or radio links In some embodiments, HARQ RTTs of different durations for different CCs, or radio links, can be matched in duration by configuring a different number of HARQ processes for the different CCs or radio links. This may avoid HARQ stalling due to a stop-and-wait HARQ procedure and over-provisioning of HARQ process IDs as compared to the case where a same number of HARQ processes are used across different CCs or radio links. In some embodiments, matching the durations may minimize HARQ buffer memory requirements at the UE. In some embodiments, matching the durations may also support a larger number of carriers for a given HARQ buffer memory size.

In some embodiments, multiple HARQ entities that share HARQ process IDs may allow performing HARQ retransmissions from any CC or radio link, independent of the CC or radio link from which the prior transmissions or retransmissions were performed. For example, performing HARQ retransmissions and feedback on a TN link instead of a NTN link on which an original transmission occurred. This may be beneficial in the context of integrated TN/NTN networks in 6G, because of the longer RTT and lower reliability typical of NTN links as compared to conventional TN links.

In some embodiments, there is provided a method for downlink signaling to associate UL logical channels or radio bearers with specific radio links.

In some embodiments, there is provided a system including multiple link types sharing a single air interface. Examples of the multiple link types include a TN link and a NTN link. In some embodiments, the system may include quality of service (QoS) provisioning of resources over the multiple link types.

Figure 12:
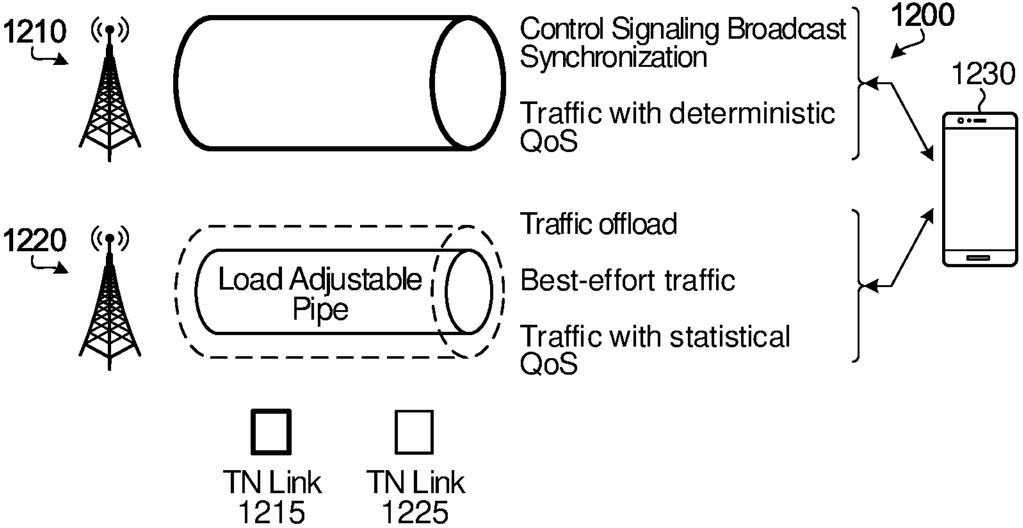
FIG. 12 is a schematic diagram illustrating a multi-link logical channel that can be used for sharing traffic in an integrated TN and NTN system.

In the single air interface that includes at least one TN link and at least one NTN link, the TN radio link (or CC or bandwidth part (BWP)) may be used for high priority traffic or traffic with deterministic (i.e. strict) QoS requirements, or both. Examples of high priority traffic may include, but are not limited to, control signaling, emergency services, security services, network access, broadcast channel, and a synchronization (SYNC) channel. The NTN radio link (or CC or BWP) may be used for best-effort traffic, or traffic with statistical QoS requirements, or both. Examples of best-effort traffic may include, but are not limited to, delay-tolerant content such as movies, pictures and music. FIG. 12 is a schematic diagram showing a system 1200 including multiple link types sharing a single air interface. The system 1200 include a TN link 1215 between a TN BS 1210 and a UE 1230 and a NTN link 1225 between a satellite 1220 and a UE 1230. The NTN link 1225 has a load adjustable bandwidth that can be used a offload traffic as desired, or as the NTN link is capable of providing.

In some embodiments, dynamic switching may occur for using different link types in order to satisfy traffic-type and/or application-specific QoS requirements, such as high priority and deterministic QoS requirements and best effort traffic.

In some embodiments, a system comprising multiple link types using a single air interface as described herein may enable dynamic traffic offloading and spectrum expansion or retraction based on a knowledge of load in the system.

In some embodiments, the NTN radio link (or CC) can be used opportunistically to provide a best possible QoS.

In some embodiments, DL control signaling may be used to associate at least a first logical channel (or radio bearer) with a first radio link or radio type link and to associate at least a second logical channel (or radio bearer) with a second radio link or radio type link. In some embodiments, the first radio link is a NT radio link and the second radio link is a NTN radio link. In some embodiments. the DL control signaling may be higher layer UE-specific or UE-dedicated RRC, MAC-CE or DCI.

In some embodiments, the association of a logical channel or radio bearer with a radio link may be used to control UL data that is transmitted on multiple radio links by multiplexing the UL data on a logical channel/radio bearer.

In some embodiments, in an integrated TN and NTN system, a UE has a first radio link with a TN access node and has a second radio link with a NTN access node. UL data can be multiplexed such that UL data that is delay sensitive may be transmitted over the first radio link and UL data that is not delay sensitive may be transmitted over the second radio link DL control signaling can be received from either the TN access node or the NTN access node. DL control signaling can be received via semi-static UE-specific (or UE-dedicated) RRC signaling or MAC-CE messaging over PDSCH or DCI over PDCCH. DL control signaling can be used to define a multiplexing allowance for a first logical channel or radio bearer and a second logical channel or radio bearer. DL control signaling can be used to define an association between a RL ID and a logical channel ID or radio bearer ID. In some embodiments, DL control signaling can be used to define both the multiplexing allowance and the association between a RL ID and a logical channel/radio bearer ID.

A system comprising multiple link types using a single air interface that includes QoS provisioning of resources over the multiple link types may enable efficient resource utilization by matching traffic type with appropriate physical resources that allows a target QoS of the traffic to be achieved while optimizing resource utilization at the physical layer.

Figure 13:
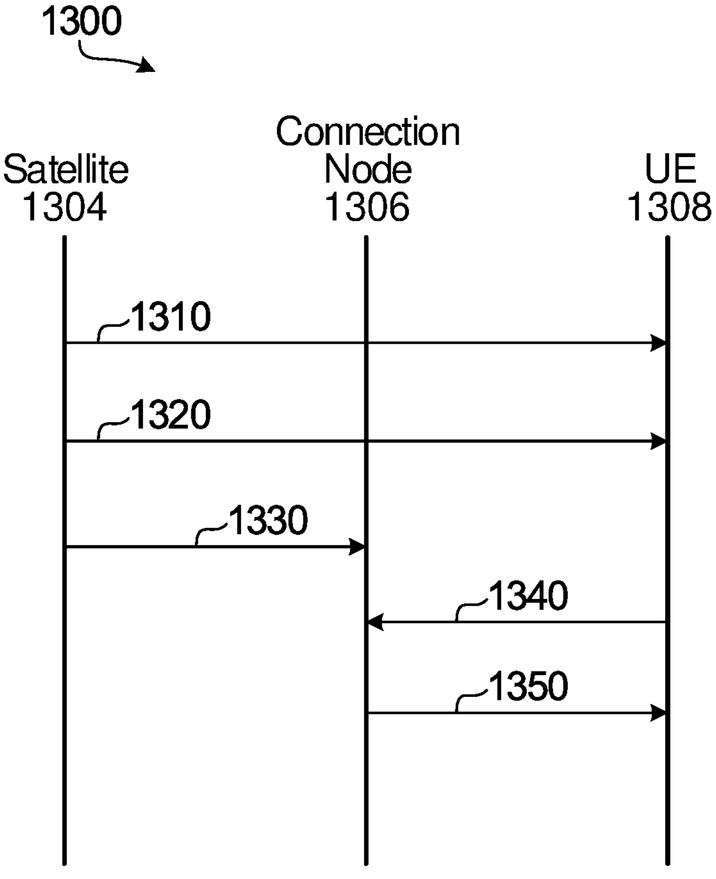
FIG. 13 is a signal flow diagram illustrating signaling between nodes in integrated TN and NTN network for a downlink (DL) transmission with HARQ over multiple radio link types according to according to embodiments of the present disclosure.

FIG. 13 is a signal flow diagram 1300 illustrating correspondence between a satellite 1304 in a non-terrestrial network (NTN), a connection node 1306 and a UE 1308.

The connection node 1306 may be a NTN access node, an integrated access backhaul (IAB) NTN, node, a TN access node or an IAB TN node.

At 1310, the satellite 1304 sends configuration information to the UE 1308 to allow hybrid automatic repeat request (HARQ) process sharing across multiple radio link types. In some embodiments, this configuration information may be consistent with, for example, the configuration information shown in FIG. 3.

The following paragraphs that pertain to configuration information being received by the UE is configuration information that may be sent by the satellite in signaling step 1310. This configuration information signaling 1310 is shown as a single signaling, however, the configuration information may be sent in a single message or command, or several messages or commands.

In some embodiments, configuration with the configuration information is performed in a semi-static manner. In some embodiments, configuration with the configuration information is performed in a combination of a semi-static and dynamic manner. For example, the configuration can be performed less frequently on a semi-static basis and then some of the configuration information or all of the configuration information can be updated more frequently on a dynamic basis.

In some embodiments, the configuration information includes an indication indicating that a pool of HARQ process IDs are common across at least the first and second physical resources. An examples of this is shown in FIG. 9. The first HARQ process ID and the second HARQ process ID may be the same, which indicates that the first and second HARQ process IDs map to the shared HARQ process. An examples of this is shown in FIG. 11.

In some embodiments, the configuration information includes at least a mapping, a rule, or a parameter in respect of a rule that associates the second HARQ process ID with the first HARQ process ID. In some embodiments, the mapping, rule, or parameter that associates the second HARQ process ID with the first HARQ process ID is semi-statically configured.

In some embodiments, the configuration information includes an index offset that indicates a index offset between the first and second HARQ process IDs. In some embodiments, the configuration information includes an identification of a number of shifts between the first and second HARQ process IDs. In some embodiments, the index offset and the first and the identification of a number of shifts can be expressed as binary values. Examples of such index offset and shifts between the first and second HARQ process IDs are described above with reference to FIG. 9.

In some embodiments, the configuration information includes an index indicating a offset and a number of shifts that together with a semi-statically configured rule or formula associate the second HARQ process ID with the first HARQ process ID.

In some embodiments, the UE may receive a HARQ codebook configuration indicating acknowledgement (ACK) or negative acknowledgment (NACK) resources that are used for transmitting an ACK or a NACK in respect of the TB, or versions of the TB, received over multiple physical resources. In some embodiments, the HARQ codebook configuration indicates an ACK or NACK resource for transmitting the ACK or NACK in respect of the TB, or versions of the TB, received over multiple physical resources. In some embodiments, the UE may transmit the ACK or NACK on the first physical resource and/or the second physical resource.

At 1320 the satellite 1304 sends to the UE 1308, in a first physical resource associated with a first radio link type, which is a NTN radio link, an initial transmission of a transport block (TB) with a first HARQ process ID that is associated with of the TB. Prior to the satellite 1304 sending the initial transmission, the UE 1308 receives a first downlink control information (DCI) for scheduling the initial transmission of the TB in the first physical resource associated with the first radio link type. The first DCI includes the first HARQ process ID.

In some embodiments, a field in the first DCI indicates that there is a DCI in respect of the TB on a different network resource and a second field in the second DCI indicating that the second DCI is in respect to the TB transported on the different network resource. In some embodiments, the configuration information further includes at least one semi-statically configured mapping rule that associates the first HARQ process ID on the first physical resource with the second HARQ process ID on the second physical resource, and the first DCI including the first field and the second DCI including the second field together indicate that the first and second DCIs are in respect of the TB only when the first HARQ process ID is associated with the second HARQ process ID through the at least one mapping rule.

In some embodiments, the first DCI includes a first TB size indicator indicating a size of a first TB and a first new data indicator (NDI) and the second DCI comprises a second DCI indicating the same TB size, and wherein the first NDI and the second NDI are the same.

In some embodiments, the first DCI includes an indicator indicating at least one of an identifier of the second physical resource and the second HARQ process ID. In some embodiments, the second DCI includes an indicator indicating at least one of an identifier of the first network physical and the first HARQ process ID.

At 1330, the satellite 1304 sends to the connection node 1306, a copy of the initial transmission of the TB. The copy can be the same HARQ version of the TB or a different HARQ version of the TB. Prior to the satellite 1304 sending the copy of the initial transmission, the connection node 1306 receives a DCI for scheduling the copy of the initial transmission of the TB to the connection node 1306. The DCI can be different than the first DCI and the resource used to send the copy of the initial TB may be a wireless backhaul resource, that is unrelated to the first or second physical resource.

At 1340, the UE 1308 sends on a third physical resource of a second radio link type, an acknowledgement to the connection node 1306, based on the configuration information, indicating whether the TB sent in the first transmission 1340 was successfully received.

Upon receiving a negative acknowledgement (NACK) from the UE 1308, the connection node 1306 schedules a retransmission of the TB to the UE 1308. At 1350 the connection node 1306 sends to the UE 1308, in a second physical resource associated with the second radio link type, the retransmission of the TB with a second HARQ process ID.

The first HARQ process ID and the second HARQ process ID map to a shared HARQ process.

In some embodiments, a field in the second DCI indicates that the second DCI is in respect of a retransmission of the TB. In some embodiments, a semi-static configuration associates the second HARQ process ID with the first HARQ process ID, wherein the first DCI includes the first HARQ process ID, the second DCI includes the second HARQ process ID, and together with the field in the second DCI, all this configuration information indicates that the first and second HARQ process IDs map to the shared HARQ process. In some embodiments, the first DCI and the second DCI are in respect of the same TB, and the first DCI and the second DCI are received within a specified time window of one another. In some embodiments, the UE receives the first DCI and the second DCI in a single PDCCH. In some embodiments, the UE expects to receive the second DCI within a certain time window of sending a negative acknowledgement to the connection node and therefore monitors for a PDCCH on the second physical resource within the time window starting after sending the negative acknowledgement to the connection node.

In some embodiments, a field in the second DCI indicating that the second DCI is in respect of a retransmission of the TB. In some embodiments, a semi-static configuration associates the second HARQ process ID with the first HARQ process ID, wherein the first DCI includes the first HARQ process ID, the second DCI includes the second HARQ process ID, and together with the field in the second DCI, all this configuration information indicates that the first and second HARQ process IDs map to the shared HARQ process. In some embodiments, the first DCI and the second DCI are in respect of the same TB, and the first DCI and the second DCI are received within a specified time window of one another. In some embodiments, the UE receives the first DCI and the second DCI in a single PDCCH.

Although not shown in FIG. 13, the UE 1308 may send a further ACK/NACK with regard to retransmission 1350 and additional retransmissions could occur in the same manner as necessary.

The NTN radio type link has a first propagation delay and the TN radio link has a second propagation delay and the first propagation delay is longer than the second propagation delay.

In some embodiments, the first or second physical resource, for example used in signaling 1320 and 1350 of FIG. 13, is an unlicensed physical resource. In some embodiments, the third physical resource, for example used in signaling 1340 of FIG. 13, is an unlicensed physical resource.

In the example of FIG. 13, the satellite 1304 is transmitting the configuration information to the UE 1308 in signaling 1310. In this example, the satellite 1304 includes the BS functionality and so the signaling is sent from the satellite 1304. In some embodiments, the BS functionality may be based at a NTN Gateway node. In such a case, the NTN Gateway node transmits the configuration information to the satellite 1304 and the satellite 1304 forwards the signaling 1310 to the UE 1308. In some embodiments, the BS functionality may be based at a TN BS. In such a case, the TN BS transmits the configuration information to the satellite 1304 and the satellite 1304 forwards the signaling 1310 to the UE 1308 or the TN BS transmits the configuration information directly to the UE 1308.

The first physical resource and the second physical resource include at least one of a frequency resource, a time-frequency resource, a code resource, a spatial beam direction resource, a spatial-frequency resource i.e. component carrier resource configured to be transmitted or received with a certain beam angular direction, a bandwidth part (BWP) resource, a carrier resource, a component carrier resource, or a serving cell resource.

Figure 14:
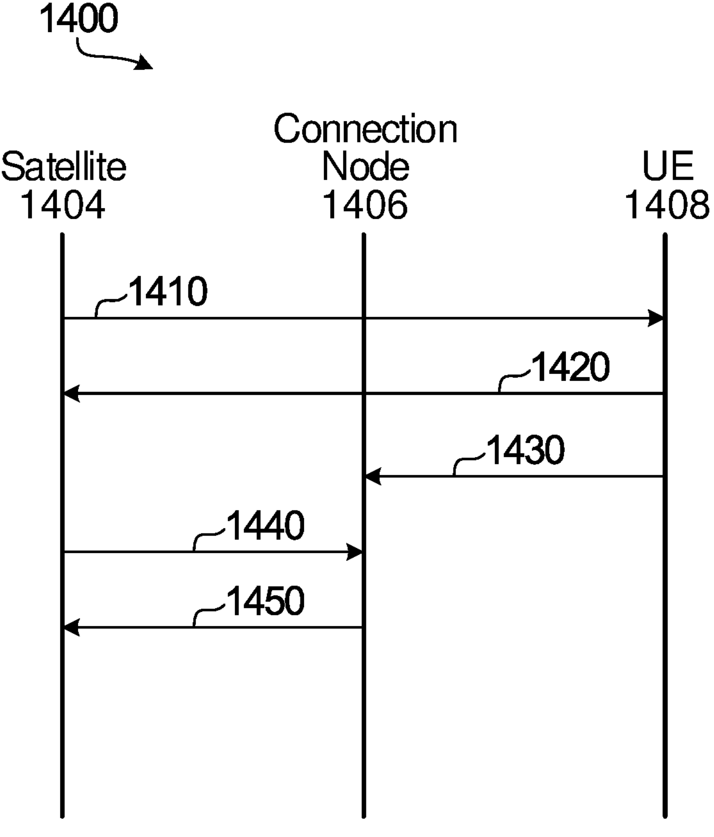
FIG. 14 is a signal flow diagram illustrating signaling between nodes in integrated TN and NTN network for a downlink (UL) transmission with HARQ over multiple radio link types according to according to embodiments of the present disclosure.

FIG. 14 is a signal flow diagram 1400 illustrating correspondence between a satellite 1404 in a non-terrestrial network (NTN), a connection node 1406 and a UE 1408. The connection node 1406 may be a NTN access node, an integrated access backhaul (IAB) NTN, node, a TN access node or an IAB TN node.

At 1410, the satellite 1404 sends configuration information to the UE 1408 to allow hybrid automatic repeat request (HARQ) process sharing across multiple radio link types. This radio link configuration includes beam direction information for communicating with the connection node 1406. In some embodiments, this configuration information may be consistent with, for example, the configuration information shown in FIG. 3.

The following paragraphs that pertain to configuration information being received by the UE is configuration information that may be sent by the satellite in signaling step 1410. This configuration information signaling 1410 is shown as a single signaling, however, the configuration information may be sent in a single message or command, or several messages or commands.

In some embodiments, configuration with the configuration information is performed in a semi-static manner. In some embodiments, configuration with the configuration information is performed in a combination of a semi-static and dynamic manner. For example, the configuration can be performed less frequently on a semi-static basis and then some of the configuration information or all of the configuration information can be updated more frequently on a dynamic basis In some embodiments, the configuration information includes an indication indicating that a pool of HARQ process IDs are common across at least a first and second physical resources. An examples of this is shown in FIG. 9. The first HARQ process ID and the second HARQ process ID may be the same, which indicates that the first and second HARQ process IDs map to the shared HARQ process. An examples of this is shown in FIG. 11.

In some embodiments, the configuration information includes at least a mapping, a rule, or a parameter in respect of a rule that associates the second HARQ process ID with the first HARQ process ID. In some embodiments, the mapping, rule, or parameter that associates the second HARQ process ID with the first HARQ process ID is semi-statically configured.

In some embodiments, the configuration information includes an index offset that indicates an index offset between the first and second HARQ process IDs. In some embodiments, the configuration information includes an identification of a number of shifts between the first and second HARQ process IDs. In some embodiments, the index offset and the first and the identification of a number of shifts can be expressed as binary values. Examples of such index offset and shifts between the first and second HARQ process IDs are described above with reference to FIG. 9

In some embodiments, the configuration information includes an index indicating a offset and a number of shifts that together with a semi-statically configured rule or formula associate the second HARQ process ID with the first HARQ process ID.

In some embodiments, the UE may receive a HARQ codebook configuration indicating acknowledgement (ACK) or negative acknowledgment (NACK) resources that are used for transmitting an ACK or a NACK in respect of the TB, or versions of the TB, received over multiple physical resources. In some embodiments, the HARQ codebook configuration indicates an ACK or NACK resource for transmitting the ACK or NACK in respect of the TB, or versions of the TB, received over multiple physical resources. In some embodiments, the UE may transmit the ACK or NACK on the first physical resource and/or the second physical resource.

At 1420 the UE 1408 sends to the satellite 1404, in a first physical resource associated with a first radio link type, which is a NTN radio link, an initial transmission of a transport block (TB) with a first HARQ process ID that is associated with of the TB. Prior to the UE 1408 sending the initial transmission, the UE 1308 receives a first downlink control information (DCI) for scheduling the initial transmission of the TB in the first physical resource associated with the first radio link type. The first DCI includes the first HARQ process ID.

In some embodiments, a field in the first DCI indicates that there is a DCI in respect of the TB on a different physical resource and a second field in the second DCI indicating that the second DCI is in respect to the TB transported on the different physical resource. In some embodiments, the configuration information further includes at least one semi-statically configured mapping rule that associates the first HARQ process ID on the first physical resource with the second HARQ process ID on the second physical resource, and the first DCI including the first field and the second DCI including the second field together indicate that the first and second DCIs are in respect of the TB only when the first HARQ process ID is associated with the second HARQ process ID through the at least one mapping rule.

In some embodiments, the first DCI includes a first TB size indicator indicating a size of a first TB and a first new data indicator (NDI) and the second DCI comprises a second DCI indicating the same TB size, and wherein the first NDI and the second NDI are the same.

In some embodiments, the first DCI includes an indicator indicating at least one of an identifier of the second physical resource and the second HARQ process ID. In some embodiments, the second DCI includes an indicator indicating at least one of an identifier of the first physical resource and the first HARQ process ID.

At 1430, the UE 1404 sends to the connection node 1406, a copy of the initial transmission of the TB. Prior to the UE 1404 sending the copy of the initial transmission, the connection node 1406 receives a DCI for scheduling the copy of the initial transmission of the TB to the connection node 1406. The first DCI includes a first HARQ process ID that is associated with of the TB. The DCI can be different than the first DCI and the resource used so send the copy of the initial TB may be a wireless backhaul resource, that is unrelated to the first or second physical resource.

At 1440, the satellite 1408 sends on a third physical resource of a second radio link type, an acknowledgement to the connection node 1406, based on the configuration information, indicating whether the TB sent in the first transmission 1340 was successfully received.

Upon receiving a negative acknowledgement (NACK) from the satellite 1404, the connection node 1406 schedules a retransmission of the TB to the satellite 1404. At 1450 the connection node 1406 sends to the satellite 1404, in a second physical resource associated with the second radio link type, the retransmission of the TB with a second HARQ process ID.

The first HARQ process ID and the second HARQ process ID map to a shared HARQ process.

In some embodiments, a field in the second DCI indicates that the second DCI is in respect of a retransmission of the TB. In some embodiments, a semi-static configuration associates the second HARQ process ID with the first HARQ process ID, wherein the first DCI includes the first HARQ process ID, the second DCI includes the second HARQ process ID, and together with the field in the second DCI, all this configuration information indicates that the first and second HARQ process IDs map to the shared HARQ process. In some embodiments, the first DCI and the second DCI are in respect of the same TB, and the first DCI and the second DCI are received within a specified time window of one another. In some embodiments, the UE receives the first DCI and the second DCI in a single PDCCH.

In some embodiments, a field in the second DCI indicating that the second DCI is in respect of a retransmission of the TB. In some embodiments, a semi-static configuration associates the second HARQ process ID with the first HARQ process ID, wherein the first DCI includes the first HARQ process ID, the second DCI includes the second HARQ process ID, and together with the field in the second DCI, all this configuration information indicates that the first and second HARQ process IDs map to the shared HARQ process. In some embodiments, the first DCI and the second DCI are in respect of the same TB, and the first DCI and the second DCI are received within a specified time window of one another. In some embodiments, the UE receives the first DCI and the second DCI in a single PDCCH.

Although not shown in FIG. 14, the satellite 1404 may send a further ACK/NACK with regard to retransmission 1450 and additional retransmissions could occur in the same manner as necessary.

The NTN radio type link has a first propagation delay and the TN radio link has a second propagation delay and the first propagation delay is longer than the second propagation delay.

In some embodiments, the first or second physical resource, for example used in signaling 1420 and 1450 of FIG. 14, is an unlicensed physical resource. In some embodiments, the third physical resource, for example used in signaling 1440 of FIG. 13, is an unlicensed physical resource.

In the example of FIG. 14, the satellite 1404 is transmitting the configuration information to the UE 1408 in signaling 1410. In this example, the satellite 1404 includes the BS functionality and so the signaling is sent from the satellite 1404. In some embodiments, the BS functionality may be based at a NTN Gateway node. In such a case, the NTN Gateway node transmits the configuration information to the satellite 1404 and the satellite 1404 forwards the signaling 1410 to the UE 1408. In some embodiments, the BS functionality may be based at a TN BS. In such a case, the TN BS transmits the configuration information to the satellite 1404 and the satellite 1404 forwards the signaling 1410 to the UE 1408 or the TN BS transmits the configuration information directly to the UE 1408.

The first physical resource and the second physical resource include at least one of a frequency resource, a time-frequency resource, a code resource, a spatial beam direction resource, a spatial-frequency resource i.e. component carrier resource configured to be transmitted or received with a certain beam angular direction, a bandwidth part (BWP) resource, a carrier resource, a component carrier resource, or a serving cell resource. It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:

receiving, by an apparatus, configuration information to allow hybrid automatic repeat request (HARQ) process sharing across multiple radio link types;

receiving, by the apparatus, a first downlink control information (DCI) for scheduling a first transmission of a transport block (TB) in a first physical resource on a first radio link associated with a first radio link type, the first DCI comprising a first HARQ process ID;

receiving, by the apparatus, a second DCI for scheduling a second transmission, wherein the second transmission is a retransmission of at least a portion of the TB in a second physical resource on a second radio link associated with a second radio link type, the second DCI comprising a second HARQ process ID;

communicating, by the apparatus, with a first access node, in the first physical resource on the first radio link, the first transmission with the first HARQ process ID; and communicating, by the apparatus, with a second access node, in the second physical resource on the second radio link, the second transmission with the second HARQ process ID;

wherein the first DCI for scheduling the first transmission of the TB comprises an activation or deactivation indication for activating or deactivating HARQ feedback and retransmission over the first radio link or the second radio link;

wherein the first HARQ process ID and the second HARQ process ID map to a shared HARQ process; and wherein:

the first radio link is a non-terrestrial network (NTN) radio link and the first access node is a NTN access node or an integrated access backhaul (IAB) NTN node and the second radio link is a terrestrial network (TN) radio link and the second access node is a TN access node or an IAB TN node; or the first radio link is a TN radio link and the first access node is a TN access node or an IAB TN node and the second radio link is a NTN radio link and the second access node is a NTN access node or an IAB NTN node.

2. The method of claim 1, wherein the first radio link type has a first propagation delay and the second radio link type has a second propagation delay.

3. The method of claim 2, wherein:

when the first radio link is a NTN radio link, the first propagation delay is longer than the second propagation delay; and when the first radio link is a TN radio link, the first propagation delay is shorter than the second propagation delay.

4. The method of claim 1, wherein communicating the first and second transmissions comprises transmitting the first transmission to the first access node and transmitting the second transmission to the second access node.

5. The method of claim 1, wherein communicating the first and second transmissions comprises receiving the first transmission from the first access node and receiving the second transmission from the second access node.

6. The method of claim 5 further comprising transmitting, on a third physical resource of the second radio link, an acknowledgement, based on the configuration information, indicating whether the TB was successfully received.

7. The method of claim 1, wherein the first radio link is a non-terrestrial network (NTN) radio link and the first access node is a NTN access node or an integrated access backhaul (IAB) NTN node and the second radio link is a terrestrial network (TN) radio link and the second access node is a TN access node or an IAB TN node.

8. The method of claim 1, wherein the first radio link is a TN radio link and the first access node is a TN access node or an IAB TN node and the second radio link is a NTN radio link and the second access node is a NTN access node or an IAB NTN node.

9. An apparatus comprising:

a processor coupled with a computer-readable medium having stored thereon computer-executable instructions, that when executed, cause the apparatus to:

receive configuration information to allow hybrid automatic repeat request (HARQ) process sharing across multiple radio link types;

receive a first downlink control information (DCI) for scheduling a first transmission of a transport block (TB) in a first physical resource on a first radio link associated with a first radio link type, the first DCI comprising a first HARQ process ID;

receive a second DCI for scheduling a second transmission, wherein the second transmission is a retransmission of at least a portion of the TB in a second physical resource on a second radio link associated with a second radio link type, the second DCI comprising a second HARQ process ID;

communicate with a first access node, in the first physical resource on the first radio link, the first transmission with the first HARQ process ID; and communicate with a second access node, in the second physical resource on the second radio link, the second transmission with the second HARQ process ID;

wherein the first DCI for scheduling the first transmission of the TB comprises an activation or deactivation indication for activating or deactivating HARQ feedback and retransmission over the first radio link or the second radio link;

wherein the first HARQ process ID and the second HARQ process ID map to a shared HARQ process; and wherein:

the first radio link is a non-terrestrial network (NTN) radio link and the first access node is a NTN access node or an integrated access backhaul (IAB) NTN node and the second radio link is a terrestrial network (TN) radio link and the second access node is a TN access node or an IAB TN node; or the first radio link is a TN radio link and the first access node is a TN access node or an IAB TN node and the second radio link is a NTN radio link and the second access node is a NTN access node or an IAB NTN node.

10. The apparatus of claim 9, wherein the first radio link type has a first propagation delay and the second radio link type has a second propagation delay.

11. The apparatus of claim 10, wherein:

when the first radio link is a NTN radio link, the first propagation delay is longer than the second propagation delay; and when the first radio link is a TN radio link, the first propagation delay is shorter than the second propagation delay.

12. The apparatus of claim 9, wherein the instructions cause the apparatus to communicate the first and second transmissions by transmitting the first transmission to the first access node and transmitting the second transmission to the second access node.

13. The apparatus of claim 9, wherein the instructions cause the apparatus to communicate the first and second transmissions by receiving the first transmission from the first access node and receiving the second transmission from the second access node.

14. The apparatus of claim 13, wherein the computer-executable instructions further cause the apparatus to transmit on a third physical resource of the second radio link, an acknowledgement, based on the configuration information, indicating whether the TB was successfully received.

15. A non-transitory processor-readable medium storing instructions that when executed by a processor, cause the processor to perform a method including:

receiving configuration information to allow hybrid automatic repeat request (HARQ) process sharing across multiple radio link types;

receiving a first downlink control information (DCI) for scheduling a first transmission of a transport block (TB) in a first physical resource on a first radio link associated with a first radio link type, the first DCI comprising a first HARQ process ID;

receiving a second DCI for scheduling a second transmission, wherein the second transmission is a retransmission of at least a portion of the TB in a second physical resource on a second radio link associated with a second radio link type, the second DCI comprising a second HARQ process ID;

communicating with a first access node, in the first physical resource on the first radio link, the first transmission with the first HARQ process ID; and communicating with a second access node, in the second physical resource on the second radio link, the second transmission with the second HARQ process ID;

wherein the first DCI for scheduling the first transmission of the TB comprises an activation or deactivation indication for activating or deactivating HARQ feedback and retransmission over the first radio link or the second radio link;

wherein the first HARQ process ID and the second HARQ process ID map to a shared HARQ process; and wherein:

the first radio link is a non-terrestrial network (NTN) radio link and the first access node is a NTN access node or an integrated access backhaul (IAB) NTN node and the second radio link is a terrestrial network (TN) radio link and the second access node is a TN access node or an IAB TN node; or the first radio link is a TN radio link and the first access node is a TN access node or an IAB TN node and the second radio link is a NTN radio link and the second access node is a NTN access node or an IAB NTN node.

16. The non-transitory processor-readable medium of claim 15, wherein the first radio link type has a first propagation delay and the second radio link type has a second propagation delay.

17. The non-transitory processor-readable medium of claim 16, wherein:

when the first radio link is a NTN radio link, the first propagation delay is longer than the second propagation delay; and when the first radio link is a TN radio link, the first propagation delay is shorter than the second propagation delay.

18. The non-transitory processor-readable medium of claim 15, wherein communicating the first and second transmissions comprises transmitting the first transmission to the first access node and transmitting the second transmission to the second access node.

19. The non-transitory processor-readable medium of claim 15, wherein communicating the first and second transmissions comprises receiving the first transmission from the first access node and receiving the second transmission from the second access node.

20. The non-transitory processor-readable medium of claim 19, wherein the instructions, when executed by the processor, further cause the processor to perform transmitting on a third physical resource of the second radio link, an acknowledgement, based on the configuration information, indicating whether the TB was successfully received.

* * * * *